US00RE50463E

(19) United States
(12) Reissued Patent
Telford et al.

(10) Patent Number: US RE50,463 E
(45) Date of Reissued Patent: Jun. 24, 2025

(54) CHILD CARRIER

(71) Applicant: The ERGO Baby Carrier, Inc., Torrance, CA (US)

(72) Inventors: Rodney V. Telford, Torrance, CA (US); Daruni M. Gotel, Makawao, HI (US); Carol J. Lubick, Kula, HI (US)

(73) Assignee: The ERGO Baby Carrier, Inc., Torrance, CA (US)

(21) Appl. No.: 18/206,922

(22) Filed: Jun. 7, 2023

Related U.S. Patent Documents

Reissue of:
(64) Patent No.: 11,026,521
Issued: Jun. 8, 2021
Appl. No.: 16/682,288
Filed: Nov. 13, 2019

U.S. Applications:
(63) Continuation of application No. 16/204,581, filed on Nov. 29, 2018, now Pat. No. 10,506,885, which is a continuation of application No. 15/916,990, filed on Mar. 9, 2018, now Pat. No. 10,172,478, which is a continuation of application No. 15/602,744, filed on May 23, 2017, now Pat. No. 9,955,797, which is a continuation of application No. 15/170,629, filed on (Continued)

(51) Int. Cl.
*A47D 13/02* (2006.01)

(52) U.S. Cl.
CPC ..... *A47D 13/025* (2013.01)

(58) Field of Classification Search
CPC ..... A47D 13/025; A47D 13/02–029
See application file for complete search history.

(56) References Cited

U.S. PATENT DOCUMENTS 238,932 A 12/1882 Poirier
268,932 A 12/1882 Poirier
(Continued)

FOREIGN PATENT DOCUMENTS

AT 11620 U2 2/2011
AU 2003275751 A1 6/2004
(Continued)

OTHER PUBLICATIONS

English machine translation of JP-2012187352-A (Year: 2012).*
(Continued)

*Primary Examiner* — Laura Davison
(74) *Attorney, Agent, or Firm* — Erise IP, P.A.

(57) ABSTRACT

A child carrier having a waist belt, an upper torso support, a hammock coupled to the waist belt and to the upper torso support, and a thigh support strap extending to each side of the hammock. Each thigh support strap has an inward end portion proximate to the hammock and an outward end portion configured for selective coupling to the upper torso support in multiple positions. When the thigh support straps are coupled to the upper torso support, the hammock and the thigh support straps form a seat to support a child in an ergonomic spread-squat position in inward and outward facing orientations. The shape of the seat adjusts depending on the positions in which the outward end portions of the thigh support straps are coupled to the upper torso support.

20 Claims, 10 Drawing Sheets

Related U.S. Application Data

Jun. 1, 2016, now Pat. No. 9,713,391, which is a continuation of application No. 14/862,933, filed on Sep. 23, 2015, now Pat. No. 9,380,888, which is a continuation of application No. 14/209,580, filed on Mar. 13, 2014, now Pat. No. 9,185,993.

(60) Provisional application No. 61/780,161, filed on Mar. 13, 2013.

(56) References Cited

U.S. PATENT DOCUMENTS

| | | | | |
|---|---|---|---|---|
| 569,258 | A | | 10/1896 | Walker |
| 576,292 | A | | 2/1897 | Vanderburgh |
| 632,887 | A | | 9/1899 | Voncanon |
| 982,376 | A | | 1/1911 | MacFarlane |
| 1,026,489 | A | | 5/1912 | Blake |
| 2,212,746 | A | | 8/1940 | Nelson |
| 2,599,474 | A | | 6/1952 | Mills |
| 2,994,300 | A | | 8/1961 | Grahling |
| 3,097,773 | A | | 7/1963 | Cunningham |
| 3,229,873 | A | | 1/1966 | Hershman |
| 3,275,373 | A | | 9/1966 | Card |
| 3,327,914 | A | | 6/1967 | Abram |
| 3,481,517 | A | | 12/1969 | Aukerman |
| 3,780,919 | A | | 12/1973 | Hansson |
| 3,840,162 | A | | 10/1974 | Horenstein et al. |
| 3,871,562 | A | | 3/1975 | Grenier |
| 3,964,654 | A | | 6/1976 | Wittenberger |
| 4,009,808 | A | | 3/1977 | Sharp |
| D247,199 | S | | 2/1978 | Carter |
| 4,139,131 | A | | 2/1979 | Hathaway |
| 4,149,687 | A | | 4/1979 | Nunemacher |
| D253,558 | S | | 12/1979 | Carter |
| 4,234,229 | A | | 11/1980 | Arnold |
| 4,273,215 | A | | 6/1981 | Leggett |
| 4,318,502 | A | | 3/1982 | Lowe et al. |
| 4,324,430 | A | | 4/1982 | Dimas, Jr. |
| 4,333,591 | A | | 6/1982 | Case |
| D266,800 | S | | 11/1982 | Kula et al. |
| 4,361,259 | A | | 11/1982 | Chanter |
| 4,402,440 | A | | 9/1983 | Purtzer et al. |
| 4,434,920 | A | | 3/1984 | Moore |
| 4,467,945 | A | | 8/1984 | Schaapveld |
| 4,469,259 | A | | 9/1984 | Krich et al. |
| 4,479,595 | A | | 10/1984 | Opsal |
| D276,478 | S | | 11/1984 | Fallon |
| 4,480,775 | A | | 11/1984 | Stanford |
| 4,492,326 | A | | 1/1985 | Storm |
| D277,811 | S | | 3/1985 | Moore |
| 4,550,800 | A | | 11/1985 | Dietrich |
| 4,579,264 | A | | 4/1986 | Napolitano |
| 4,651,366 | A | | 3/1987 | Lande et al. |
| 4,666,017 | A | | 5/1987 | Zimmerman |
| 4,724,988 | A | | 2/1988 | Tucker |
| 4,746,044 | A | | 5/1988 | Arvizu |
| 4,765,279 | A | | 8/1988 | Klickstein |
| 4,800,629 | A | | 1/1989 | Ikeda |
| 4,867,464 | A | | 9/1989 | Cook |
| 4,946,119 | A | | 8/1990 | Hellhake |
| 4,986,458 | A | | 1/1991 | Linday |
| 5,020,709 | A | * | 6/1991 | Hoaglan ..... A47D 13/025 224/625 |
| 5,071,047 | A | | 12/1991 | Cordisco |
| 5,076,598 | A | | 12/1991 | Nauman |
| D324,607 | S | | 3/1992 | Nelson |
| 5,114,059 | A | | 5/1992 | Thatcher |
| 5,129,406 | A | | 7/1992 | Magnusen et al. |
| D334,253 | S | | 3/1993 | Balzarini |
| 5,205,450 | A | | 4/1993 | DeRosier |
| 5,205,451 | A | | 4/1993 | Manzer |
| 5,224,637 | A | | 7/1993 | Colombo |
| 5,240,159 | A | | 8/1993 | Gregory |
| 5,246,152 | A | | 9/1993 | Dotseth |
| 5,284,279 | A | | 2/1994 | Sason et al. |
| 5,325,818 | A | | 7/1994 | Leach |
| D357,800 | S | | 5/1995 | Roan et al. |
| 5,490,620 | A | | 2/1996 | Bergqvist |
| D370,996 | S | | 6/1996 | Shimura et al. |
| 5,522,528 | A | | 6/1996 | Petricola |
| 5,564,612 | A | | 10/1996 | Gregory |
| 5,570,823 | A | | 11/1996 | Lindy |
| D377,116 | S | | 1/1997 | Shimura et al. |
| D385,105 | S | | 10/1997 | Fair |
| 5,673,828 | A | | 10/1997 | Raedel et al. |
| 5,678,739 | A | | 10/1997 | Darling et al. |
| 5,690,258 | A | | 11/1997 | Kataoka et al. |
| 5,692,655 | A | | 12/1997 | Fair et al. |
| 5,699,555 | A | | 12/1997 | Schunter |
| 5,725,139 | A | | 3/1998 | Smith |
| 5,732,861 | A | | 3/1998 | Jakobson |
| D395,161 | S | | 6/1998 | Fair et al. |
| 5,772,088 | A | | 6/1998 | Nelson |
| 5,791,535 | A | | 8/1998 | Roan et al. |
| D397,867 | S | | 9/1998 | Fair et al. |
| 5,799,851 | A | | 9/1998 | Wulf et al. |
| 5,813,580 | A | | 9/1998 | Fair |
| 5,819,341 | A | | 10/1998 | Simantob et al. |
| 5,848,576 | A | | 12/1998 | Colaianni |
| 5,848,741 | A | | 12/1998 | Fair |
| 5,927,235 | A | | 7/1999 | Olaiz |
| 5,934,528 | A | | 8/1999 | Higuchi |
| D414,032 | S | | 9/1999 | Howell |
| 5,988,742 | A | | 11/1999 | Stevens |
| 6,055,686 | A | | 5/2000 | Knight |
| 6,073,820 | A | | 6/2000 | Drobinski |
| 6,079,780 | A | | 6/2000 | Bapst |
| 6,125,792 | A | | 10/2000 | Gee |
| 6,155,579 | A | | 12/2000 | Eyman et al. |
| 6,164,509 | A | | 12/2000 | Gausling et al. |
| 6,179,175 | B1 | | 1/2001 | Painter |
| D437,996 | S | | 2/2001 | Fair et al. |
| 6,182,873 | B1 | | 2/2001 | Christopher et al. |
| 6,257,468 | B1 | | 7/2001 | Yamazoe et al. |
| D453,066 | S | | 1/2002 | Norman |
| D455,546 | S | | 4/2002 | Norman |
| 6,364,186 | B1 | | 4/2002 | Gilmour et al. |
| 6,409,060 | B2 | | 6/2002 | Donine |
| 6,415,969 | B1 | | 7/2002 | Higuchi |
| 6,443,339 | B1 | | 9/2002 | Higuchi |
| 6,499,165 | B1 | | 12/2002 | Morgillo |
| 6,520,391 | B2 | | 2/2003 | Yen |
| 6,598,771 | B2 | | 7/2003 | Norman |
| 6,609,642 | B2 | | 8/2003 | Heinz et al. |
| D484,685 | S | | 1/2004 | Kassai et al. |
| 6,681,973 | B2 | | 1/2004 | Crumrine |
| D486,635 | S | | 2/2004 | Yagisawa et al. |
| 6,715,651 | B2 | | 4/2004 | Le Gal |
| 6,722,543 | B1 | | 4/2004 | Fitzgerald et al. |
| 6,736,299 | B2 | | 5/2004 | Bergkvist et al. |
| 6,763,983 | B2 | | 7/2004 | Norman |
| 6,772,925 | B2 | | 8/2004 | O'Hare |
| D507,869 | S | | 8/2005 | Liistro et al. |
| D509,056 | S | | 9/2005 | Shiraishi et al. |
| 7,007,353 | B2 | | 3/2006 | Bergkvist et al. |
| 7,070,076 | B2 | | 7/2006 | Bergkvist et al. |
| 7,073,866 | B1 | | 7/2006 | Berdahl |
| 7,168,600 | B2 | | 1/2007 | Hwang |
| 7,204,462 | B2 | | 4/2007 | Lembo |
| 7,204,468 | B2 | | 4/2007 | Kintzele |
| 7,255,620 | B1 | | 8/2007 | Shepherd |
| 7,284,503 | B2 | | 10/2007 | Elmberg |
| 7,322,498 | B2 | | 1/2008 | Frost |
| 7,343,880 | B2 | | 3/2008 | Bergkvist |
| D567,499 | S | | 4/2008 | Elmberg et al. |
| 7,494,031 | B2 | | 2/2009 | Kassai et al. |
| D590,568 | S | | 4/2009 | Crutchfield |
| D597,788 | S | | 8/2009 | Ellis |
| D615,750 | S | | 5/2010 | Jones et al. |
| D619,818 | S | | 7/2010 | Bergkvist |
| 7,766,199 | B1 | | 8/2010 | Caperon |
| 7,779,490 | B2 | | 8/2010 | Bergkvist |
| 7,780,236 | B2 | | 8/2010 | Bergkvist |
| D623,401 | S | | 9/2010 | Bergkvist et al. |

(56) References Cited

U.S. PATENT DOCUMENTS

| | | | |
|---|---|---|---|
| D623,402 | S | 9/2010 | Bergkvist et al. |
| D627,141 | S | 11/2010 | Elmberg |
| D632,887 | S | 2/2011 | Jones et al. |
| 7,878,587 | B1 | 2/2011 | Leach |
| 7,886,946 | B2 | 2/2011 | Gray |
| D634,584 | S | 3/2011 | Bergkvist |
| 8,028,871 | B2 | 10/2011 | Gray |
| 8,042,869 | B2 | 10/2011 | McClintock et al. |
| D647,693 | S | 11/2011 | Olegård et al. |
| D649,345 | S | 11/2011 | Bergkvist et al. |
| D653,938 | S | 2/2012 | Bergkvist |
| D655,495 | S | 3/2012 | Sauer et al. |
| 8,127,385 | B1 | 3/2012 | Goutevenier |
| D656,749 | S | 4/2012 | Bergkvist |
| 8,172,116 | B1 | 5/2012 | Lehan et al. |
| D662,778 | S | 7/2012 | Sauer et al. |
| D664,351 | S | 7/2012 | Bergkvist et al. |
| 8,272,546 | B2 | 9/2012 | Leistensnider |
| D678,693 | S | 3/2013 | Bergkvist et al. |
| 8,403,189 | B2 | 3/2013 | Nyberg et al. |
| 8,408,435 | B2 | 4/2013 | Refsum |
| 8,424,732 | B1 | 4/2013 | Lehan et al. |
| D683,654 | S | 6/2013 | Andren et al. |
| 8,453,894 | B2 | 6/2013 | Jung et al. |
| D691,215 | S | 10/2013 | Madigan |
| D692,227 | S | 10/2013 | Andren et al. |
| D692,680 | S | 11/2013 | Bergkvist et al. |
| 8,579,168 | B2 | 11/2013 | Zack et al. |
| 8,590,757 | B2 | 11/2013 | Frost |
| 8,627,988 | B2 | 1/2014 | Bergkvist |
| 8,636,181 | B2 | 1/2014 | Gunter et al. |
| 8,650,663 | B2 | 2/2014 | Fair et al. |
| 8,701,949 | B1 | 4/2014 | Lehan et al. |
| 8,726,437 | B2 | 5/2014 | Hardesty |
| 8,745,794 | B1 | 6/2014 | McDermott |
| 8,752,739 | B2 | 6/2014 | Bergkvist et al. |
| 8,756,728 | B2 | 6/2014 | Bergkvist |
| 8,789,882 | B2 | 7/2014 | Bergkvist |
| 8,973,794 | B2 | 3/2015 | Bergkvist et al. |
| 9,022,260 | B2 | 5/2015 | Frost |
| D733,419 | S | 7/2015 | Wikner et al. |
| 9,179,758 | B2 | 11/2015 | Calilung et al. |
| 9,185,993 | B2 | 11/2015 | Telford et al. |
| 9,220,352 | B2 | 12/2015 | Frost |
| 9,314,113 | B1 | 4/2016 | Lehan et al. |
| 9,357,852 | B2 | 6/2016 | Salazar et al. |
| 9,357,854 | B2 | 6/2016 | Sundberg et al. |
| 9,380,887 | B2 | 7/2016 | Frost |
| 9,380,888 | B2 | 7/2016 | Telford et al. |
| 9,439,515 | B2 | 9/2016 | Kim |
| D773,838 | S | 12/2016 | Ejvinsson et al. |
| D785,325 | S | 5/2017 | Samrelius et al. |
| D786,363 | S | 5/2017 | Andrén |
| D789,160 | S | 6/2017 | Strandberg et al. |
| 9,675,141 | B2 | 6/2017 | Wikner et al. |
| 9,713,391 | B2 | 7/2017 | Telford et al. |
| 9,788,664 | B2 | 10/2017 | Andren |
| D803,549 | S | 11/2017 | Warfaa et al. |
| D807,025 | S | 1/2018 | Elmberg et al. |
| 9,877,595 | B2 | 1/2018 | Wang |
| 9,877,596 | B2 | 1/2018 | Schaarschmidt |
| D811,082 | S | 2/2018 | Lehan |
| 9,955,797 | B2 | 5/2018 | Telford et al. |
| D828,997 | S | 9/2018 | Lehan |
| 10,076,194 | B2 | 9/2018 | Wikner et al. |
| D832,602 | S | 11/2018 | Elmberg et al. |
| 10,159,357 | B2 | 12/2018 | Telford |
| 10,172,478 | B2 | 1/2019 | Telford |
| 10,264,895 | B2 | 4/2019 | Lindeman |
| 10,271,663 | B2 | 4/2019 | Salazar |
| D850,804 | S | 6/2019 | Andersson et al. |
| D851,916 | S | 6/2019 | Andersson et al. |
| 10,313,929 | B2 | 6/2019 | Bhamidipati et al. |
| 10,426,275 | B2 | 10/2019 | Telford |
| 10,433,656 | B2 | 10/2019 | Lundh |
| 10,441,090 | B2 | 10/2019 | Lehan |
| 10,506,885 | B2 | 12/2019 | Telford et al. |
| D879,413 | S | 3/2020 | Ejvinsson et al. |
| D879,414 | S | 3/2020 | Ejvinsson et al. |
| 10,653,251 | B1 | 5/2020 | Young |
| D886,667 | S | 6/2020 | Andersson et al. |
| D891,295 | S | 7/2020 | Andersson et al. |
| 10,702,074 | B2 | 7/2020 | Najafi et al. |
| 10,736,436 | B2 | 8/2020 | Telford |
| 10,743,678 | B2 | 8/2020 | Salazar et al. |
| D899,130 | S | 10/2020 | Dolk et al. |
| 10,874,178 | B2 | 12/2020 | Cheng |
| 10,905,252 | B2 | 2/2021 | Fan |
| 10,905,253 | B2 | 2/2021 | Fan |
| D913,683 | S | 3/2021 | Björkenkvist et al. |
| 11,026,519 | B2 | 6/2021 | Fan |
| 11,026,520 | B2 | 6/2021 | Fan |
| 11,026,521 | B2 | 6/2021 | Telford et al. |
| 11,039,695 | B2 | 6/2021 | Fan |
| 11,051,634 | B2 | 7/2021 | Telford |
| D930,976 | S | 9/2021 | Andersson et al. |
| D933,356 | S | 10/2021 | Elmberg |
| 11,191,368 | B2 | 12/2021 | Manouchehri et al. |
| 11,219,317 | B2 | 1/2022 | Telford |
| 11,272,791 | B2 | 3/2022 | Warner |
| 11,297,957 | B2 | 4/2022 | Telford |
| D954,156 | S | 6/2022 | Hoxter et al. |
| D955,102 | S | 6/2022 | Kleremo et al. |
| 11,357,337 | B2 | 6/2022 | Dolk et al. |
| 11,440,444 | B2 | 9/2022 | Shahbandar |
| D975,993 | S | 1/2023 | Kleremo et al. |
| 11,583,104 | B2 | 2/2023 | Telford |
| D980,623 | S | 3/2023 | Kleremo et al. |
| D984,117 | S | 4/2023 | Fan |
| 11,684,175 | B2 | 6/2023 | Telford |
| 11,759,027 | B2 | 9/2023 | Cheng |
| 11,786,055 | B2 | 10/2023 | Telford |
| 11,882,943 | B2 | 1/2024 | Telford |
| 12,137,818 | B2 | 11/2024 | Telford |
| 2002/0011503 | A1 | 1/2002 | Hwang |
| 2002/0158433 | A1 | 10/2002 | Naurois et al. |
| 2002/0175194 | A1 | 11/2002 | Norman |
| 2003/0106916 | A1 | 6/2003 | Boone |
| 2003/0178452 | A1 | 9/2003 | Norman |
| 2004/0066066 | A1 | 4/2004 | Hobson |
| 2004/0149790 | A1 | 8/2004 | Kassai et al. |
| 2004/0155078 | A1 | 8/2004 | Hwang |
| 2004/0238579 | A1 | 12/2004 | Krogh |
| 2005/0045674 | A1 | 3/2005 | Rehbein |
| 2005/0067549 | A1 | 3/2005 | Kintzele et al. |
| 2005/0242136 | A1 | 4/2005 | Moriguchi et al. |
| 2005/0155995 | A1 | 7/2005 | Lee |
| 2005/0184114 | A1 | 8/2005 | Hoff et al. |
| 2005/0279785 | A1 | 12/2005 | Liistro et al. |
| 2006/0011678 | A1 | 1/2006 | Kassai et al. |
| 2006/0076373 | A1 | 4/2006 | Labelle et al. |
| 2006/0130220 | A1 | 6/2006 | Morgan et al. |
| 2006/0261104 | A1 | 11/2006 | Zambrzycki |
| 2007/0029356 | A1 | 2/2007 | Moriguchi et al. |
| 2007/0057003 | A1 | 3/2007 | Keyes |
| 2007/0185370 | A1 | 8/2007 | Eyck |
| 2007/0241146 | A1 | 10/2007 | Nyberg et al. |
| 2007/0293656 | A1 | 12/2007 | Caravan et al. |
| 2008/0047987 | A1 | 2/2008 | Price |
| 2008/0190972 | A1 | 8/2008 | Gray |
| 2008/0283561 | A1 | 11/2008 | Parness |
| 2009/0165209 | A1 | 7/2009 | Bergkvist |
| 2009/0256408 | A1 | 10/2009 | Bergkvisit |
| 2010/0025441 | A1 | 2/2010 | Blaney |
| 2010/0072236 | A1 | 3/2010 | Parness et al. |
| 2010/0147910 | A1 | 6/2010 | Schachtner |
| 2010/0187269 | A1 | 7/2010 | Leistensnider |
| 2010/0308087 | A1 | 12/2010 | Lindbloom |
| 2010/0308088 | A1 | 12/2010 | Lindblom |
| 2011/0062195 | A1 | 3/2011 | Jones et al. |
| 2011/0101051 | A1 | 5/2011 | Parness |
| 2011/0163136 | A1 | 7/2011 | Billingham |
| 2011/0219539 | A1 | 9/2011 | Bergkvist |
| 2011/0290831 | A1 | 12/2011 | Wang |

(56) References Cited

U.S. PATENT DOCUMENTS

| | | | |
|---|---|---|---|
| 2012/0025569 | A1 | 2/2012 | Bergkvist |
| 2012/0037284 | A1 | 2/2012 | Korbonski |
| 2012/0043359 | A1 | 2/2012 | Bergkvist et al. |
| 2012/0061429 | A1 | 3/2012 | Sauer |
| 2012/0187161 | A1 | 7/2012 | Bergkvist |
| 2012/0187162 | A1 | 7/2012 | Bergkvist et al. |
| 2012/0205406 | A1 | 8/2012 | Schachtner |
| 2012/0241487 | A1 | 9/2012 | Zack et al. |
| 2012/0298702 | A1 | 11/2012 | Jung |
| 2014/0014692 | A1 | 1/2014 | Andren et al. |
| 2014/0097215 | A1 | 4/2014 | Caperon |
| 2014/0167462 | A1 | 6/2014 | Lai et al. |
| 2014/0263491 | A1 | 9/2014 | Telford et al. |
| 2014/0284361 | A1 | 9/2014 | Wang |
| 2014/0319189 | A1 | 10/2014 | Hoppener-Visser |
| 2015/0069097 | A1 | 3/2015 | Lindblom |
| 2015/0181984 | A1 | 7/2015 | Wikner et al. |
| 2015/0208821 | A1 | 7/2015 | Frost |
| 2015/0223614 | A1 | 8/2015 | Pos |
| 2015/0272342 | A1 | 10/2015 | Schaarschmidt |
| 2015/0374139 | A1 | 12/2015 | Salazar et al. |
| 2016/0015187 | A1 | 1/2016 | Telford et al. |
| 2016/0150893 | A1 | 6/2016 | Salazar et al. |
| 2016/0227940 | A1 | 8/2016 | Wikner et al. |
| 2016/0270555 | A1 | 9/2016 | Telford et al. |
| 2016/0278537 | A1 | 9/2016 | Frost |
| 2016/0296034 | A1 | 10/2016 | Telford |
| 2016/0316933 | A1 | 11/2016 | Antunovic |
| 2017/0119173 | A1 | 5/2017 | Telford |
| 2017/0150826 | A1 | 6/2017 | Salazar |
| 2017/0196374 | A1 | 7/2017 | Chen |
| 2017/0251829 | A1 | 9/2017 | Telford et al. |
| 2018/0000258 | A1 | 1/2018 | Lehan |
| 2018/0116426 | A1 | 5/2018 | Telford et al. |
| 2018/0184813 | A1 | 7/2018 | Salazar |
| 2018/0192788 | A1 | 7/2018 | Telford et al. |
| 2018/0199730 | A1 | 7/2018 | Lundh |
| 2018/0206653 | A1 | 7/2018 | Andrus et al. |
| 2018/0235379 | A1 | 8/2018 | Lindeman et al. |
| 2018/0296005 | A1 | 10/2018 | Tsai |
| 2019/0014920 | A1 | 1/2019 | Matsuyama |
| 2019/0075936 | A1 | 3/2019 | Salazar et al. |
| 2019/0075937 | A1 | 3/2019 | Salazar |
| 2019/0090657 | A1 | 3/2019 | Telford |
| 2019/0150633 | A1 | 5/2019 | Flaunty |
| 2019/0223619 | A1 | 7/2019 | Lindeman |
| 2019/0350379 | A1 | 11/2019 | Antunovic |
| 2019/0380508 | A1 | 12/2019 | Telford et al. |
| 2020/0077806 | A1 | 3/2020 | Telford et al. |
| 2020/0146464 | A1 | 5/2020 | Manouchehri et al. |
| 2020/0163466 | A1 | 5/2020 | Telford |
| 2020/0253392 | A1 | 8/2020 | Sahadi et al. |
| 2020/0268169 | A1 | 8/2020 | Telford |
| 2021/0059431 | A1 | 3/2021 | Elmberg |
| 2021/0186234 | A1 | 6/2021 | Dolk et al. |
| 2021/0361079 | A1 | 11/2021 | Salazar et al. |
| 2021/0393049 | A1 | 12/2021 | Telford |
| 2022/0151398 | A1 | 5/2022 | Telford |
| 2022/0176853 | A1 | 6/2022 | Shahbandar |
| 2023/0248122 | A1 | 8/2023 | Cheng |

FOREIGN PATENT DOCUMENTS

| | | | |
|---|---|---|---|
| AU | 2006229579 | A1 | 10/2006 |
| AU | 2012109532 | | 1/2012 |
| AU | 2012209531 | A1 | 7/2013 |
| AU | 2012209532 | A1 | 7/2013 |
| AU | 2013287314 | A1 | 1/2015 |
| AU | 2015377212 | A1 | 8/2017 |
| CA | 1332928 | | 11/1994 |
| CA | 1332928 | C | 11/1994 |
| CA | 2159241 | | 9/1995 |
| CA | 2159241 | A1 | 3/1996 |
| CA | 2 240 015 | | 1/2000 |
| CA | 2240015 | A1 | 1/2000 |
| CA | 2971848 | A1 | 7/2016 |
| CA | 2739444 | C | 7/2017 |
| CA | 2755425 | C | 10/2017 |
| CA | 2822606 | C | 1/2018 |
| CA | 3091109 | A1 | 8/2019 |
| CA | 2822551 | C | 10/2019 |
| CA | 2878911 | C | 3/2020 |
| CA | 2878933 | C | 8/2020 |
| CA | 3160906 | A1 | 7/2021 |
| CN | 102378588 | A | 3/2012 |
| CN | 203873395 | U | 10/2014 |
| CN | 104411213 | A | 3/2015 |
| CN | 104470406 | A | 3/2015 |
| CN | 204363531 | U | 6/2015 |
| CN | 105377085 | A | 3/2016 |
| CN | 106263837 | A | 1/2017 |
| CN | 108135370 | A | 6/2018 |
| CN | 108244885 | A | 7/2018 |
| CN | 109480542 | A | 3/2019 |
| CN | 109480543 | A | 3/2019 |
| CN | 110897429 | A | 3/2020 |
| CN | 111712162 | A | 9/2020 |
| CN | 111885949 | A | 11/2020 |
| CN | 114668265 | A | 6/2022 |
| CN | 115399601 | A | 11/2022 |
| CZ | 2010531 | A3 | 1/2012 |
| DE | 29519530 | U1 | 4/1996 |
| DE | 22912951 | U1 | 1/2000 |
| DE | 29912951 | U1 | 1/2000 |
| DE | 20116046 | | 1/2002 |
| DE | 20116046 | U1 | 1/2002 |
| DE | 20 2008 014 412 | U1 | 9/2009 |
| DE | 202008014412 | | 9/2009 |
| DE | 202010011906 | | 11/2010 |
| DE | 202010011906 | U1 | 11/2010 |
| DE | 202011103052 | U1 | 8/2011 |
| DE | 10767394 | | 10/2012 |
| DE | 202012104318 | | 11/2012 |
| DE | 202012104318 | U1 | 11/2012 |
| DE | 20201400616 | U1 | 6/2014 |
| DE | 202014100616 | U1 | 6/2014 |
| DK | 2421413 | T2 | 7/2014 |
| EP | 0046672 | | 3/1982 |
| EP | 0046672 | A1 | 3/1982 |
| EP | 0437365 | A1 | 7/1991 |
| EP | 0662292 | | 7/1995 |
| EP | 0662292 | A1 | 7/1995 |
| EP | 0 995 380 | | 10/1998 |
| EP | 0995380 | A1 | 4/2000 |
| EP | 1055382 | | 11/2000 |
| EP | 1055382 | A1 | 11/2000 |
| EP | 1591044 | A1 | 11/2005 |
| EP | 1707082 | A1 | 10/2006 |
| EP | 1717082 | | 10/2006 |
| EP | 1765123 | A2 | 3/2007 |
| EP | 1893058 | A1 | 3/2008 |
| EP | 1992257 | A1 | 11/2008 |
| EP | 2037777 | A1 | 3/2009 |
| EP | 2037778 | A1 | 3/2009 |
| EP | 1765123 | | 6/2011 |
| EP | 2346378 | A1 | 7/2011 |
| EP | 2413747 | A1 | 2/2012 |
| EP | 2413748 | A1 | 2/2012 |
| EP | 2421413 | A1 | 2/2012 |
| EP | 2667747 | A1 | 12/2013 |
| EP | 2667748 | A1 | 12/2013 |
| EP | 2810587 | A1 | 12/2014 |
| EP | 2872011 | A1 | 5/2015 |
| EP | 2872012 | A1 | 5/2015 |
| EP | 3054813 | A1 | 8/2016 |
| EP | 3244778 | A4 | 8/2018 |
| EP | 4094639 | A1 | 11/2022 |
| ES | 251704 | | 10/1980 |
| ES | 251704 | U | 10/1980 |
| ES | 2343215 | | 7/2010 |
| ES | 2382645 | | 6/2012 |
| ES | 2437222 | | 1/2014 |
| ES | 2527676 | | 1/2015 |
| ES | 2531641 | | 3/2015 |

(56) References Cited

FOREIGN PATENT DOCUMENTS

| | | | | |
|---|---|---|---|---|
| ES | 2582469 | | 9/2016 | |
| ES | 2585565 | | 10/2016 | |
| ES | 2644318 | | 11/2017 | |
| ES | 2823558 | | 5/2021 | |
| ES | 2868448 | | 10/2021 | |
| ES | 2889755 | | 1/2022 | |
| FR | 1 545 820 | | 9/1967 | |
| FR | 1545820 | A | 11/1968 | |
| FR | 2 524 288 | | 10/1983 | |
| FR | 2 794 010 | | 5/1999 | |
| FR | 2794010 | A1 | 12/2000 | |
| FR | 2794010 | B1 | 7/2001 | |
| FR | 2806279 | | 9/2001 | |
| FR | 2806279 | A3 | 9/2001 | |
| FR | 2823655 | A1 | 10/2002 | |
| FR | 2 851 436 | | 8/2004 | |
| FR | 2851436 | A1 | 8/2004 | |
| FR | 2823655 | B1 | 11/2004 | |
| GB | 2026848 | A | 8/1978 | |
| GB | 2028633 | | 3/1980 | |
| GB | 2028633 | A | 3/1980 | |
| GB | 2314026 | | 12/1987 | |
| GB | 2260687 | | 4/1993 | |
| GB | 2260687 | A | 4/1993 | |
| GB | 2314026 | A | 12/1997 | |
| GB | 2346314 | A | 8/2000 | |
| JP | 53-146441 | | 4/1952 | |
| JP | 53-155443 | | 12/1978 | |
| JP | 54-108131 | | 7/1979 | |
| JP | 58-95766 | | 6/1983 | |
| JP | 59-21273 | | 2/1984 | |
| JP | 63-187956 | | 12/1988 | |
| JP | 1-72158 | | 5/1989 | |
| JP | H0172158 | U | 5/1989 | |
| JP | 2-124107 | | 5/1990 | |
| JP | 09-099842 | | 10/1995 | |
| JP | H0999842 | A | 4/1997 | |
| JP | 9-121987 | | 5/1997 | |
| JP | 09-173185 | | 8/1997 | |
| JP | 10-313929 | | 2/1998 | |
| JP | 10-108764 | | 4/1998 | |
| JP | 11046938 | | 2/1999 | |
| JP | 3073766 | U | 12/2000 | |
| JP | U3073766 | | 12/2000 | |
| JP | 2001104115 | A | 4/2001 | |
| JP | P2001-104115 | | 4/2001 | |
| JP | 2002186543 | A | 7/2002 | |
| JP | 3403599 | | 5/2003 | |
| JP | H10201580 | A | 5/2003 | |
| JP | 2003225119 | | 8/2003 | |
| JP | 2003225119 | A | 8/2003 | |
| JP | 2005-131146 | | 10/2003 | |
| JP | 2005-185426 | | 12/2003 | |
| JP | 2004000687 | | 1/2004 | |
| JP | 2004000687 | A | 1/2004 | |
| JP | 2004154468 | | 6/2004 | |
| JP | 2005052584 | | 3/2005 | |
| JP | 2005052584 | A | 3/2005 | |
| JP | 2005118472 | A | 5/2005 | |
| JP | 2005131146 | A | 5/2005 | |
| JP | 2005185426 | A | 7/2005 | |
| JP | 2005-288107 | | 10/2005 | |
| JP | 2005288107 | A | 10/2005 | |
| JP | 2005-312826 | | 11/2005 | |
| JP | 2005312823 | A | 11/2005 | |
| JP | 2005312826 | A | 11/2005 | |
| JP | 4170894 | B2 | 10/2008 | |
| JP | 3154408 | U | 10/2009 | |
| JP | 2010524605 | A | 7/2010 | |
| JP | 2013-118900 | | 12/2011 | |
| JP | 2012152547 | A | 8/2012 | |
| JP | 2012152548 | A | 8/2012 | |
| JP | 2012-187352 | | 10/2012 | |
| JP | 2012187352 | A * | 10/2012 | ..... A47D 13/025 |
| JP | 2012524603 | | 10/2012 | |
| JP | 2012524603 | A | 10/2012 | |
| JP | 2013118900 | A | 6/2013 | |
| JP | 2014176494 | | 9/2014 | |
| JP | 2014176494 | A | 9/2014 | |
| JP | 5859841 | B2 | 2/2016 | |
| JP | 5895766 | B2 | 3/2016 | |
| JP | 2016512124 | A | 4/2016 | |
| JP | 5921273 | B2 | 5/2016 | |
| JP | 5960429 | B2 | 8/2016 | |
| JP | 6130251 | B2 | 5/2017 | |
| JP | 2018149349 | A | 9/2018 | |
| JP | 2018531745 | A | 11/2018 | |
| JP | 6485931 | B2 | 3/2019 | |
| JP | 6530576 | B1 | 6/2019 | |
| JP | 2019088891 | A | 6/2019 | |
| JP | 2004154468 | A | 6/2024 | |
| KR | 2000508690000 | B1 | 6/1990 | |
| KR | 2000508690000 | | 10/2000 | |
| KR | 1020020008534 | | 1/2002 | |
| KR | 1020020008534 | A | 1/2002 | |
| KR | 2003126950000 | | 4/2003 | |
| KR | 2003126950000 | B1 | 5/2003 | |
| KR | 2003158200000 | B1 | 5/2003 | |
| KR | 2003158200000 | | 6/2003 | |
| KR | 2003182590000 | | 6/2003 | |
| KR | 2003182590000 | B1 | 6/2003 | |
| KR | 2003201940000 | | 7/2003 | |
| KR | 20-0324019 | | 8/2003 | |
| KR | 200324019 | Y1 | 8/2003 | |
| KR | 2003261940000 | B1 | 8/2003 | |
| KR | 2003337880000 | | 11/2003 | |
| KR | 2003337880000 | B1 | 11/2003 | |
| KR | 10-2004-0064749 | | 7/2004 | |
| KR | 1020040064749 | A | 7/2004 | |
| KR | 20060047603 | | 5/2006 | |
| KR | 10-2007-0039806 | | 4/2007 | |
| KR | 1020070039806 | A | 4/2007 | |
| KR | 2020090008715 | A | 1/2009 | |
| KR | 20-2009-0008715 | | 8/2009 | |
| KR | 20-0447518 | | 1/2010 | |
| KR | 2020100010120 | A | 2/2010 | |
| KR | 20-2010-0010120 | | 10/2010 | |
| KR | 2020110005263 | A | 1/2011 | |
| KR | 20-2011-0005263 | | 5/2011 | |
| KR | 20110132580 | A | 12/2011 | |
| KR | 101134560 | B1 | 4/2012 | |
| KR | 200459659 | Y1 | 4/2012 | |
| KR | 1020120070544 | A | 6/2012 | |
| KR | 200462354 | Y1 | 9/2012 | |
| KR | 101197918 | B1 | 11/2012 | |
| KR | 1020130107167 | A | 10/2013 | |
| KR | 20140050139 | A | 4/2014 | |
| KR | 101426751 | B1 | 8/2014 | |
| KR | 20150030251 | A | 3/2015 | |
| KR | 101525284 | B1 | 6/2015 | |
| KR | 20-0477837 | | 7/2015 | |
| KR | 200477837 | Y1 | 7/2015 | |
| KR | 1020160112243 | A | 9/2016 | |
| KR | 102325907 | A | 10/2016 | |
| KR | 101764566 | B1 | 8/2017 | |
| KR | 101834054 | B1 | 3/2018 | |
| KR | 20180031827 | A | 3/2018 | |
| KR | 101929748 | B1 | 12/2018 | |
| KR | 102022746 | B1 | 11/2019 | |
| KR | 20200095511 | A | 8/2020 | |
| KR | 20200123120 | A | 10/2020 | |
| KR | 1020207029046 | B1 | 11/2021 | |
| NO | 339506 | B1 | 12/2016 | |
| SE | 0802427 | A1 | 5/2010 | |
| SE | 533133 | C2 | 7/2010 | |
| SE | 0900412 | A1 | 10/2010 | |
| SE | 0900413 | A1 | 10/2010 | |
| SE | 0900414 | A1 | 10/2010 | |
| SE | 533613 | C2 | 11/2010 | |
| SE | 533615 | C2 | 11/2010 | |
| SE | 533616 | C2 | 11/2010 | |
| SE | 0950955 | A1 | 6/2011 | |
| SE | 534383 | C2 | 8/2011 | |
| SE | 1150048 | A1 | 7/2012 | |

(56) References Cited

FOREIGN PATENT DOCUMENTS

| | | | |
|---|---|---|---|
| SE | 1150050 | A1 | 7/2012 |
| SE | 535533 | C2 | 9/2012 |
| SE | 535534 | C2 | 9/2012 |
| SE | 540206 | C2 | 5/2018 |
| SE | 1751550 | A1 | 6/2019 |
| SE | 1850189 | A1 | 8/2019 |
| SE | 541460 | C2 | 10/2019 |
| SE | 542422 | C2 | 4/2020 |
| TW | 200913922 | A | 4/2009 |
| TW | 201034603 | A | 10/2010 |
| TW | 201039779 | A | 11/2010 |
| TW | 201039781 | A | 11/2010 |
| TW | 201105273 | A | 2/2011 |
| TW | 201332466 | A | 8/2013 |
| TW | 202233104 | A | 9/2022 |
| WO | 9505952 | A1 | 3/1995 |
| WO | 199505952 | | 3/1995 |
| WO | WO 199505952 | A1 | 3/1995 |
| WO | 200189978 | | 5/2001 |
| WO | WO 200189978 | A1 | 11/2001 |
| WO | 2006116117 | | 11/2006 |
| WO | 2009034233 | A1 | 3/2009 |
| WO | WO 2009034233 | | 3/2009 |
| WO | 2010123447 | A1 | 10/2010 |
| WO | WO 2010123447 | | 10/2010 |
| WO | 2011011158 | A2 | 1/2011 |
| WO | WO 2011011158 | | 1/2011 |
| WO | 2011071441 | A1 | 6/2011 |
| WO | WO 2011071441 | | 6/2011 |
| WO | 2012079787 | A1 | 6/2012 |
| WO | WO 2012079787 | | 6/2012 |
| WO | 2012109467 | A1 | 8/2012 |
| WO | 2013079296 | A1 | 6/2013 |
| WO | WO 2014033134 | A1 | 3/2014 |
| WO | 2014160355 | A1 | 10/2014 |
| WO | 2015053696 | A1 | 4/2015 |
| WO | WO 2015053696 | | 4/2015 |
| WO | 2016153411 | A1 | 9/2016 |
| WO | 2017075500 | A1 | 5/2017 |
| WO | WO 2017/095752 | A1 | 6/2017 |
| WO | 20180081603 | A1 | 3/2018 |
| WO | 2018081603 | A1 | 5/2018 |
| WO | 2019115433 | A1 | 6/2019 |
| WO | 2020112660 | A1 | 6/2020 |
| WO | 2020163585 | A1 | 8/2020 |
| WO | 2022136029 | A1 | 6/2022 |

OTHER PUBLICATIONS

Martin, et al., "Effects of Gender, Load, and Backpack on the Temporal and Kinematic Characteristics of Walking Gait vol. III", United States Army Natick, Research and Development Laboratories, Natick, MA, Apr. 1982, 77 pgs.

Nelson, et al., "Effects of Gender, Load, and Backpack on Easy Standing and Vertical Jump Performance vol. II", United States Army Natick, Research and Development Laboratories, Natick, MA, Mar. 1982, 77 pgs.

Notice of Opposition filed on Mar. 13, 2012, against European Patent No. EPI 765123 BI, 213 pgs.

Nov. 24, 1998 Letter from U.S. ITC regarding U.S. tariff classification of babyTrekker, 2 pgs., retrieved from http://www.faqs.org/rulings/rulingsl998NYD8338 I .htrnl).

Office Action for U.S. Appl. No. 15/177,114, dated Aug. 25, 2016, 10 pgs.

"Blowing Experience," The Australian Women's Weekly, National library of Australia http://nla.gov.au/nla-newspage56230l4, Oct. 11, 1978, 1 page.

"Eager Market for Baby Carrier" The Gazette, Montreal May 15, 1984: C-19 (accessed at https://news.google.com/newspapersid~zA0vAAAAIBAJ&sjid~mqUFAAAAIBAJ&pg~1454% 2C24685 I 0).

"First Journey Advantages," http://www.first-journey.com/advantagelpics/advantages1.html, Dec. 14, 2002, 1 page.

"First Journey Advantages," http://www.first-journey.com/advantagelpics/advantages2.html, Dec. 14, 2002, 1 page.

"For Shane Gould Innes-Motherhood is a Mind," The Australian Women's Weekly, <>, Oct. 11, 1978, 1 page.

"Kinderpack Wearing Instructions for Toddler Size," https://mykinderpack.corn/pages/instructions Copyright 2017 Kindercarry, 5 pgs.

"Porte-hebe chinois," http://portebebe.free.fr/, Jun. 5, 2002, 6 pgs.

"The Beginning" Ergo Baby Blog, 13 pgs., retrieved from https://blog.ergobaby.corn/2011/02/the-beginning/).

"The Five Hidden Features of the Yemaya Baby Carrier," <>, Oct. 13, 2016 ISARA, 7 pgs.

Chinese Patent Application 202111280861.6 Notice of Allowance issued Aug. 1, 2024.

U.S. Appl. No. 18/108,979 Notice of Allowance issued Aug. 13, 2024.

European Patent Application 19889231.7 Communication pursuant to Rule 114(2) EPC issued Apr. 16, 2024.

Screen captures of transcript from YouTube video clip entitled "Ergobaby Adapt Carrier Instructions Front Inward with "H" straps," 7 pages, uploaded on Jul. 4, 2016, by user "Ergobaby UK & Ireland". Retrieved from Internet: https://www.youtube.com/watch?v=pET5hq_hfL8&ab_channel=ErgobabyUK%26Ireland.

European Patent Application 21180405.9 Notice of Opposition issued Mar. 13, 2023.

Japanese Patent Application 2021-529471 Penultimate Official Action issued Feb. 19, 2024.

U.S. Appl. No. 18/196,539 Notice of Allowance issued Jul. 23, 2024.

U.S. Appl. No. 18/243,500 Notice of Allowance issued Jul. 26, 2024.

Packababy, 17 pgs., retrieved from Web Archives of http://www.packababy.corn/.

Rose, Marion, Baby Carriers—Cultural History, Aware Parenting, Dec. 8, 2006, 11 pgs., retrieved from http://awareparenting.blogspot.corn/2006/12/baby-carriers-cultural-history.html.

Weego Soft Baby Carrier, Instructions for Use, Weego Babytragesiicke, Berlin, DE, 4 pgs.

Worrnleighton, A., "Baby Gifts: To Sew, Applique, Crochet and Knit," Copyright Marshall Cavendish Limited, 1998, 13 pgs.

Japanese Patent Application 2021-529471 Notice of Allowance issued May 28, 2024.

Apprica, Baby strap "Laclis Laclis", Baby Products Apprica Official Website Sep. 2023, https:// www.aprica.jp/products/sling/detail/sling/laclis/, Japan.

Corrected Notice of Allowability for U.S. Appl. No. 15/796,422, dated May 30, 2019, 53 pgs.

Infantino, Flip 4-in-1 Convertible Carrier Instruction Manual, 2018, www.info@Blue-box.com.

Infantino, Flip 4-in-1 Convertible Carrier Instruction Manual, 2022, www.infantino.com.

International Search Report and Written Opinion for International Application No. PCT/US2019/063052, dated May 25, 2021, 8 pgs.

International Search Report and Written Opinion, International Patent Application No. PCT/US2017/058820, dated Jan. 5, 2018, 11 pgs.

Lascal M1 Carrier User Manual, ASTM F2236-16a, EN13209-2:2015, US-80006 Ver13, www.lascal.net.

Lucky Industries Co., Ltd., Lucky 1934 Lucky Fuwa Hug, Waist Belt Type, https://lucky-industries.jp/products/lucky1934-fuwa-hug/, Japan.

Lucky Industries Co., Ltd., Lucky1934 (Lucky 1934) fuwahug Fuwahug Baby Carrier Baby Strap L4620 (from 14 days old), https:// luckybabystore.jp/products/fuwahug 2023, Japan.

Meet ISARA Quick Half Buckle Carrier, https:// www.yumpu.com/en/document/read/63362302/isara-quick-half-buckle-carrier.

Najell Rise, Baby Carrier I 0-3 years I 3 Carrying Position, https://najell.com/p/najell-rise-jet-black.

Notice of Allowance for Chinese Patent Application No. CN-201480023993.2, dated Mar. 5, 2018, 7 pages.

(56) References Cited

OTHER PUBLICATIONS

Notice of Allowance for Korean Patent Application No. KR 10-2015-7028949, dated Dec. 13, 2017, 11 pages.
Notice of Allowance for U.S. Appl. No. 15/337,813, dated Jul. 1, 2019, 21 pgs.
Notice of Allowance for U.S. Appl. No. 15/796,422, dated Mar. 27, 2019, 53 pgs.
Notice of Allowance for U.S. Appl. No. 15/916,990, dated Aug. 15, 2018, 15 pgs.
Notice of Allowance for U.S. Appl. No. 15/916,990, dated Nov. 9, 2018, 44 pgs.
Notice of Allowance for U.S. Appl. No. 16/694,641, dated Sep. 7, 2021, 23 pgs.
Notice of Allowance issued for U.S. Appl. No. 15/170,629, dated Feb. 1, 2017, 14 pages.
Notice of Allowance issued for U.S. Appl. No. 15/170,629, dated Oct. 28, 2016, 14 pages.
Notice of Allowance issued for U.S. Appl. No. 15/602,744, dated Dec. 8, 2017, 14 pages.
Non-Final Office Action dated Aug. 14, 2023 issued for U.S. Appl. No. 18/202,058.
NUNA International B.V., Cudl Clik Instructions User Manual, www.nunababy.com.
Office Action issued for Chinese Patent Application No. 201480023993.2, dated Sep. 26, 2017, 5 pages.
U.S. Appl. No. 17/572,084, Final Office Action dated Jul. 10, 2023.
Office Action Issued for Japanese Patent Application No. 2016-502118, dated Apr. 7, 2017, 9 pages.
Office Action Issued for U.S. Appl. No. 15/177,114, dated Oct. 3, 2017, 5 pages.
Office Action issued for European Patent Application No. 14773586.4, dated Oct. 12, 2017, 5 pages.
Baby Trekker-Advantages, 2 pgs., retrieved from https://web.archive.org/web/20000708 I 415l/http://www.babytrekker.com/advantages.htrn.
Certified Translation of "What parents should watch out for when buying babywearing carriers" by Kirkiliones, retrieved from http://web.archive.org/web/20010719033I 13/http://www.continuum-concept.de/liedkir.htm).
Cessnock Eagle and South Mattland Recorder, vol. 32, No. 4162, Jun. 22, 1944, <>, 1 page.
Japanese Patent Application 2021-529471 Office Action issued Oct. 18, 2023.
European Patent Application 23175400.3 Extended Search Report issued Nov. 16, 2023.
BabyBjörn AB, Owner's Manual, BabyBjörn Baby Carrier Free, Version 1, 2019, www.babybjorn.com.
BabyBjörn AB, Owner's Manual, BabyBjörn Baby Carrier Harmony, Version 4, 2019, www.babybjorn.com.
BabyBjörn AB, Owner's Manual, BabyBjörn Baby Carrier Mini, Version 5, 2018, www.babybjorn.com.
BabyBjörn AB, Owner's Manual, BabyBjörn Baby Carrier Miracle, Version 5, 2011, www.babybjorn.com.
BabyBjörn AB, Owner's Manual, BabyBjörn Baby Carrier Move, Version 2, 2019, www.babybjorn.com.
BabyBjörn AB, Owner's Manual, BabyBjörn Baby Carrier Original, Version 9, 2015, www.babybjorn.com.
BabyBjörn AB, Owner's Manual, BabyBjörn Baby Carrier We, Version 2, 2015, www.babybjorn.com.
European Patent Application 16860977.4 Office Action issued Jan. 29, 2024.
U.S. Appl. No. 18/526,378 Non-Final Office Action issued Feb. 1, 2024.
Feb. 2002 forum post from "USA", 2 pgs., retrieved from http://windsorpeak.corn/vbulletin/showthread.php? 185 543-baby- bjorn-and- large-husband).
Frame Carriers, 1 pg., retrieved from https://web.archive.org/web/20000 5 28184 5 3 5/http :/ /www.evenflo .com/ ep/fumiture/framecarrier.phtml.
U.S. Appl. No. 18/196,539 Notice of Allowance issued Jul. 10, 2024.
Evenflo Soft Carriers, 2 pgs., retrieved from https://web.archive.org/web/2001033108 I I 13/http://www.evenflo .corn/ep/furniture/softcarrier.phtml.
Exhibit RX-0341, In re Matter of Certain Child Carriers, United States International Trade Commission, Inv. No. 337-TA-1154, Infantino Flip 4-in-I Carrier Design Drawings, Sep. 21, 2017, 12 pgs.
Exhibit RX-0342, In re Matter of Certain Child Carriers, United States International Trade Commission, Inv. No. 337-TA-1154, Infantino Flip 4-in-I Carrier Product Manual, 2 pgs.
Exhibit RX-0411, In re Matter of Certain Child Carriers, United States International Trade Commission, Inv. No. 337-TA-1154, The Cat Bird Baby Website Printout-Dur Booth at the ABC Kids Expo in Las Vegas, Sep. 13, 2007, 5 pgs.
European Patent Application 19889231.7 Intent to Grant issued Mar. 25, 2024.
European Patent Application 21180405.9 Notice of Opposition issued Apr. 2, 2024.
U.S. Appl. No. 18/243,500 Non-Final Office Action issued Apr. 17, 2024.
http: /koti.welho.corn/skoivune/sakara/english/index.html, Jun. 24, 2003, 2 pgs.
http://koti.welho.com/skoivune/sakara/ohje/ohje6.htrnl, May 29, 2003, 1 page., May 29, 2003, 1 page.
Joint Motion to Terminate for Inter Partes Review of U.S. Pat. No. 9,022,260 (IPR2016-01870) and U.S. Pat. No. 3,590,757 (IPR2016-01866), 3 pgs.
Jones, Sandy, Back Packs and Soft Carriers, Guide to Baby Products, Consumer Reports, 1991, pp. 9-15.
Jones, Sandy, Getting Around, Guide to Baby Products, Consumer Reports, 2001, pp. 41, 55-60, 157-160, 199-201.
Martin, et al., "A Mathematical Model of the Inertial Properties of a Carrier-Backpack System vol. IV", United States Army Natick, Research and Development Laboratories, Natick, MA, May 1982, 89 pgs.
U.S. Appl. No. 18/202,058, filed May 25, 2023, Rodney V. Telford.
Canadian Patent Application 3,120,946 Examination Report issued Dec. 4, 2023.
Chinese Patent Application 202111280861.6 First Office Action issued Dec. 27, 2023.
U.S. Appl. No. 18/108,979, Non-Final Office Action issued Jan. 18, 2024.
Chinese Patent Application No. 201780075232.5, Office Action dated May 10, 2022.
European Patent Application 16860977.4 Office Action issued Mar. 22, 2023.
European Patent Application 21180405.9 Decision to Grant issued May 11, 2023.
European Patent Application 23181194.4 Extended Search Report issued Jan. 4, 2024.
U.S. Appl. No. 17/572,084, Notice of Allowance issued Jan. 18, 2024.
Korean Patent Application No. 10-2019-7015083, Notice of Allowance, mailed Oct. 25, 2022.
KR Application No. 10-2019-7015083 Korean Office Action dated Apr. 28, 2022.
U.S. Appl. No. 18/196,539, filed May 12, 2023, Rodney V. Telford.
Notice of Allowance for U.S. Appl. No. 15/337,813, dated Feb. 14, 2019, 2 pgs.
Notice of Allowance for U.S. Appl. No. 15/337,813, dated Nov. 5, 2018, 2 pgs.
Notice of Allowance for U.S. Appl. No. 16/551,286, dated Aug. 18, 2020.
Notice of Allowance for U.S. Appl. No. 16/682,288, dated Apr. 26, 2021, 3 pgs.
Notice of Allowance for U.S. Appl. No. 16/682,288, dated Mar. 2, 2021, 3 pgs.
Rookie, Instructions Rookie Revolution Baby Carrier From New Born to Toddler, https://rookie-baby.eu/pages/instructions-revolution-baby-carrier.

(56) References Cited

OTHER PUBLICATIONS

Rookie, Instructions Rookie Premium Baby Carrier, https://rookie-baby.eu/pages/instructions-premium-baby-carrier.
Office Action with English translation for Japanese Patent Application No. 2019-523098, dated May 31, 2021, 13 pgs.
Office Action with English translation for Korean Patent Application No. 10-2020-7029046, dated Jun. 2, 2021, 8 pgs.
Peekara Story, https://blog.naver.com/becocarrier/140212053895 >, 2022.
Portier, Limited Edition Limitlesscarrier—Papillon Denim, https://portier.com.au/collections/featured/products/limited-edition-limitless-carrier-papillon-denim.
Rookie, Instructions Rookie Affinity, https://rookie-baby.eu/pages/instructions-rookie-affinity.
Rookie, Instructions Rookie Konnekt Baby Carrier, https://rookie-baby.eu/pages/instructions-rookie-konnekt-baby-carrier-1.
Korean Patent Application 10-2021-7019475, Office Action, issued Dec. 9, 2024.
*BabyBjörn AB* v. *The Ergo Baby Carrier, Inc.*, Petition for Inter Partes Review of U.S. Pat. No. 11,786,055, United States Patent and Trademark Office Before the Patent Trial and Appeal Board, IPR2025-00110, filed Oct. 29, 2024.
*BabyBjörn AB* v. *The Ergo Baby Carrier, Inc.*, Petition for Inter Partes Review of U.S. Pat. No. 11,786,055, United States Patent and Trademark Office Before the Patent Trial and Appeal Board, IPR2025-00111, filed Oct. 29, 2024.
*BabyBjörn AB* v. *The Ergo Baby Carrier, Inc.*, Petitioner's Declaration of David Smith, P.E., CSP, In Support of Petition For Inter Partes Review of U.S. Pat. No. 11,786,055, United States Patent and Trademark Office Before the Patent Trial and Appeal Board, IPR2025-00111, filed Oct. 29, 2024.
*BabyBjörn AB* v. *The Ergo Baby Carrier, Inc.*, Petitioner's Declaration of David Smith, P.E., CSP, In Support of Petition For Inter Partes Review of U.S. Pat. No. 11,786,055, United States Patent and Trademark Office Before the Patent Trial and Appeal Board, IPR2025-00110, filed Oct. 29, 2024.
BabyBjorn Baby Carrier Synergy Owners Manual, 2007, www.babybjorn.com.
Notice of Allowance (with English translation) for Korean Patent Application No. 10-2018-7015023, dated Jul. 9, 2020, 10 pgs.
Extended European Search Report for European Patent Application No. 17864576.8, dated Feb. 14, 2020, 7 pgs.
Initial Determination on Violation of Section 337 and Recommended Determination on Remedy and Bond, *In re Matter of Certain Child Carriers, United States International Trade Commission, Inv.* No. 337-TA-1154, Mar. 10, 2020, 210 pgs.
Exhibit RX-0116, *In re Matter of Certain Child Carriers, United States International Trade Commission, Inv. No. 337-TA-1154*, Photographs Embedded in McKibbon Declaration, Exhibit 3 to Depo of McKibbon, 2 pgs.
Exhibit RX-0118, *In re Matter of Certain Child Carriers, United States International Trade Commission, Inv. No. 337-TA-1154*, Photographs Embedded in McKibbon Declaration, Exhibit 4 to Depo of McKibbon, 1 pg.
Exhibit RX-0120, *In re Matter of Certain Child Carriers, United States International Trade Commission, Inv. No. 337-TA-1154*, Flickr Photos of Petals and Puddles, Exhibit 5 to Depo of McKibbon, 3 pgs.
Exhibit RX-0123, *In re Matter of Certain Child Carriers, United States International Trade Commission, Inv. No. 337-TA-1154*: Photo of carrier, Exhibit 7 to Depo of McKibbon, 1 pg.
Exhibit RX-0133, *In re Matter of Certain Child Carriers, United States International Trade Commission, Inv. No. 337-TA-1154*, Etsy Pages for petalsandpuddles, Exhibit 82 to Depo of Wick, 4 pgs.
Exhibit RX-0135, *In re Matter of Certain Child Carriers, United States International Trade Commission, Inv. No. 337-TA-1154*, Wayback Machine Page for Etsy search results baby sling, Exhibit 83 to Depo of Wick, Aug. 19, 2010, 4 pgs.
Exhibit RX-0159, *In re Matter of Certain Child Carriers, United States International Trade Commission, Inv. No. 337-TA-1154*, Ergobaby Omni 360 Cool Air Mesh Instruction Manual, 26 pgs.
Exhibit RX-0160, *In re Matter of Certain Child Carriers, United States International Trade Commission, Inv. No. 337-TA-1154*, Ergobaby Omni 360 Instruction Manual, 26 pgs.
Exhibit RX-0161, *In re Matter of Certain Child Carriers, United States International Trade Commission, Inv. No. 337-TA-1154*, Ergobaby Adapt Instruction Manual, 23 pgs.
Exhibit RX-0163, *In re Matter of Certain Child Carriers, United States International Trade Commission, Inv. No. 337-TA-1154*, Ergobaby 360 Bundle of Joy Instruction Manual, 26 pgs.
Exhibit RX-0200, *In re Matter of Certain Child Carriers, United States International Trade Commission, Inv. No. 337-TA-1154*, Declaration of Di Linh Reichman Regarding the Hibiscus Carrier, Sep. 2, 2019, 6 pgs.
Exhibit RX-0206, *In re Matter of Certain Child Carriers, United States International Trade Commission, Inv. No. 337-TA-1154*, Color Photograph (Respondent Exhibit), Exhibit 301 to Depo of Reichman, 1 pg.
Exhibit RX-0208, *In re Matter of Certain Child Carriers, United States International Trade Commission, Inv. No. 337-TA-1154*, Color Photograph (Respondent Exhibit), Exhibit 302 to Depo of Reichman, 1 pg.
Exhibit RX-0210, *In re Matter of Certain Child Carriers, United States International Trade Commission, Inv. No. 337-TA-1154*, Color Photograph (Respondent Exhibit), Exhibit 303 to Depo of Reichman, 1 pg.
Exhibit RX-0212, *In re Matter of Certain Child Carriers, United States, International Trade Commission, Inv. No. 337-TA-1154*, Color Photograph (Respondent Exhibit), Exhibit 304 to Depo of Reichman, 1 pg.
Exhibit RX-0214, *In re Matter of Certain Child Carriers, United States International Trade Commission, Inv. No. 337-TA-1154*, Color Photograph (Respondent Exhibit), Exhibit 305 to Depo of Reichman, 1 pg.
Exhibit RX-0216, *In re Matter of Certain Child Carriers, United States International Trade Commission, Inv. No. 337-TA-1154*, Color Photograph (Respondent Exhibit), Exhibit 306 to Depo of Reichman, 1 pg.
Exhibit RX-0218, *In re Matter of Certain Child Carriers, United States International Trade Commission, Inv. No. 337-TA-1154*, Color Photograph (Respondent Exhibit), Exhibit 307 to Depo of Reichman, 1 pg.
Exhibit RX-0231, *In re Matter of Certain Child Carriers, United States International Trade Commission, Inv. No. 337-TA-1154*, Declaration of Kristin Dybvig-Pawelko regarding the No Tie Mei Tai Hibiscus Child Carrier Exhibit 7 to Depo of Dr. Dybwig-Pawelko, Sep. 28, 2019, 9 pgs.
Exhibit RX-0235, *In re Matter of Certain Child Carriers, United States International Trade Commission, Inv. No. 337-TA-1154*, Color Photograph labeled A (Respondent Exhibit), Exhibit 320 to Depo of Dr. Dybwig-Pawelko, 1 pg.
Exhibit RX-0237, *In re Matter of Certain Child Carriers, United States International Trade Commission, Inv. No. 337-TA-1154*, Color Photograph labeled B (Respondent Exhibit), Exhibit 320 to Depo of Dr. Dybwig-Pawelko, 1 pg.
Exhibit RX-0239, *In re Matter of Certain Child Carriers, United States International Trade Commission, Inv. No. 337-TA-1154*, Color Photograph labeled C (Respondent Exhibit), Exhibit 320 to Depo of Dr. Dybwig-Pawelko, 1 pg.
Exhibit RX-0240, *In re Matter of Certain Child Carriers, United States International Trade Commission, Inv. No. 337-TA-1154*, Color Photograph labeled D (Respondent Exhibit), Exhibit 320 to Depo of Dr. Dybwig-Pawelko, 1 pg.
Exhibit RX-0241, *In re Matter of Certain Child Carriers, United States International Trade Commission, Inv. No. 337-TA-1154*, Omni Alternate Preliminary—For Review Only (PowerPoint) 10 pgs.
Exhibit RX-0242, *In re Matter of Certain Child Carriers, United States International Trade Commission, Inv. No. 337-TA-1154*, Color Photograph labeled E (Respondent Exhibit), Exhibit 320 to Depo of Dr. Dybwig-Pawelko, 1 pg.

(56) References Cited

OTHER PUBLICATIONS

Exhibit RX-0280, *In re Matter of Certain Child Carriers, United States International Trade Commission, Inv. No. 337-TA-1154*, TheBabyWearer post about carriers for facing out and referencing both Silly Goose and Pikkolo, Oct. 22, 2007, 9 pgs.
Exhibit RX-0289, *In re Matter of Certain Child Carriers, United States International Trade Commission, Inv. No. 337-TA-1154*, Pikkolo physical carrier and packaging, 12 pgs.
Exhibit RX-0296, *In re Matter of Certain Child Carriers, United States International Trade Commission, Inv. No. 337-TA-1154*, Tula Free-to-Grow Carrier Instruction Manual, 25 pgs.
Exhibit RX-0297, *In re Matter of Certain Child Carriers, United States International Trade Commission, Inv. No. 337-TA-1154*, Tula Explore Carrier Instruction Manual, 8 pgs.
Exhibit RX-0341, *In re Matter of Certain Child Carriers, United States International Trade Commission, Inv. No. 337-TA-1154*, Infantino Flip 4-in-1 Carrier Design Drawings, Sep. 21, 2017, 12 pgs.
Exhibit RX-0342, *In re Matter of Certain Child Carriers, United States International Trade Commission, Inv. No. 337-TA-1154*, Infantino Flip 4-in-1 Carrier Product Manual, 2 pgs.
Exhibit RX-0343, *In re Matter of Certain Child Carriers, United States International Trade Commission, Inv. No. 337-TA-1154*, Infantino Upscale Carrier Product Manual, 2016, 10 pgs.
Exhibit RX-0344, *In re Matter of Certain Child Carriers, United States International Trade Commission, Inv. No. 337-TA-1154*, Infantino Upscale Carrier Product Manual RX, 2016, 10 pgs.
Exhibit RX-0347, *In re Matter of Certain Child Carriers, United States International Trade Commission, Inv. No. 337-TA-1154*, Infantino Go Forward Evolved Product Manual, 24 pgs.
Exhibit RX-0351, *In re Matter of Certain Child Carriers, United States International Trade Commission, Inv. No. 337-TA-1154*, Photograph of Michelle McEntire and Children, Feb. 17, 2008, 1 pg.
Exhibit RX-0402, *In re Matter of Certain Child Carriers, United States International Trade Commission, Inv. No. 337-TA-1154*, Web Archive Hibiscus Baby Wearing Instructions, 2007, 3 pgs.
Exhibit RX-0411, *In re Matter of Certain Child Carriers, United States International Trade Commission, Inv. No. 337-TA-1154*, The Cat Bird Baby Website Printout—Our Booth at the ABC Kids Expo in Las Vegas, Sep. 13, 2007, 5 pgs.
Exhibit RX-0413, *In re Matter of Certain Child Carriers, United States International Trade Commission, Inv. No. 337-TA-1154*, The Cat Bird Baby Website Printout—Pikkolo, a Mei Tai-Like Buckle Carrier, Aug. 2, 2007, 5 pgs.
Exhibit RX-0415, *In re Matter of Certain Child Carriers, United States International Trade Commission, Inv. No. 337-TA-1154*, Pikkolo Carrier Design Drawings, Jul. 2007, 1 pg.
Exhibit RX-0417, *In re Matter of Certain Child Carriers, United States International Trade Commission, Inv. No. 337-TA-1154*, Cat Bird Baby Purchase Order, Sep. 25, 2007, 1 pg.
Exhibit RX-0419, *In re Matter of Certain Child Carriers, United States International Trade Commission, Inv. No. 337-TA-1154*, Sales Receipt for Pikkolo Carrier, Sep. 14, 2007, 4 pgs.
Exhibit RX-0437, *In re Matter of Certain Child Carriers, United States International Trade Commission, Inv. No. 337-TA-1154*, FlickR Page Printout, Sep. 19, 2008, 2 pgs.
Exhibit RX-0480, *In re Matter of Certain Child Carriers, United States International Trade Commission, Inv. No. 337-TA-1154*, FlickR Photograph of Closet with Different Types of Material, Apr. 30, 2008, 3 pgs.
Exhibit RX-0482, *In re Matter of Certain Child Carriers, United States International Trade Commission, Inv. No. 337-TA-1154*, FlickR Photograph of Closet with Different Types of Material, Apr. 30, 2008, 2 pgs.
Exhibit RX-0484, *In re Matter of Certain Child Carriers, United States International Trade Commission, Inv. No. 337-TA-1154*, FlickR Photograph of crafting supplies, Apr. 30, 2008, 2 pgs.
Exhibit RX-0504, *In re Matter of Certain Child Carriers, United States International Trade Commission, Inv. No. 337-TA-1154*, Exhibit A to Declaration of Joline Sikora, Jul. 10, 2007, 1 pg.
Exhibit RX-0505, *In re Matter of Certain Child Carriers, United States International Trade Commission, Inv. No. 337-TA-1154*, Exhibit B to Declaration of Joline Sikora, Jul. 11, 2007, 3 pgs.
Exhibit RX-0506, *In re Matter of Certain Child Carriers, United States International Trade Commission, Inv. No. 337-TA-1154*, Exhibit C to Declaration of Joline Sikora, Jul. 11, 2007, 3 pgs.
Exhibit RX-0507, *In re Matter of Certain Child Carriers, United States International Trade Commission, Inv. No. 337-TA-1154*, Exhibit D to Declaration of Joline Sikora, Sep. 18, 2007, 1 pg.
Exhibit RX-0508, *In re Matter of Certain Child Carriers, United States International Trade Commission, Inv. No. 337-TA-1154*, Exhibit E to Declaration of Joline Sikora, Sep. 18, 2007, 1 pg.
Exhibit RX-0509, *In re Matter of Certain Child Carriers, United States International Trade Commission, Inv. No. 337-TA-1154*, Exhibit F to Declaration of Joline Sikora, Sep. 18, 2007, 1 pg.
Exhibit RX-0510, *In re Matter of Certain Child Carriers, United States International Trade Commission, Inv. No. 337-TA-1154*, Exhibit G to Declaration of Joline Sikora, Sep. 18, 2007, 1 pg.
Exhibit RX-0512, *In re Matter of Certain Child Carriers, United States International Trade Commission, Inv. No. 337-TA-1154*, Exhibit I to Declaration of Joline Sikora, 2007), 3 pgs.
Exhibit RX-0513, *In re Matter of Certain Child Carriers, United States International Trade Commission, Inv. No. 337-TA-1154*, Exhibit J to Declaration of Joline Sikora, 1 pg.
Exhibit RX-0514, *In re Matter of Certain Child Carriers, United States International Trade Commission, Inv. No. 337-TA-1154*, Exhibit K to Declaration of Joline Sikora, 2007, 1 pg.
Exhibit RX-0515, *In re Matter of Certain Child Carriers, United States International Trade Commission, Inv. No. 337-TA-1154*, Exhibit L to Declaration of Joline Sikora, Feb. 17, 2008, 4 pgs.
Exhibit RX-0520, *In re Matter of Certain Child Carriers, United States International Trade Commission, Inv. No. 337-TA-1154*, Exhibit Q to Declaration of Joline Sikora, Aug. 23, 2007, 2 pgs.
Exhibit RX-0521, *In re Matter of Certain Child Carriers, United States International Trade Commission, Inv. No. 337-TA-1154*, Exhibit R to Declaration of Joline Sikora, Aug. 23, 2007, 2 pgs.
Exhibit RX-0522, *In re Matter of Certain Child Carriers, United States International Trade Commission, Inv. No. 337-TA-1154*, Exhibit S to Declaration of Joline Sikora, Feb. 17, 2008, 2 pgs.
Exhibit RX-0523, *In re Matter of Certain Child Carriers, United States International Trade Commission, Inv. No. 337-TA-1154*, Exhibit T to Declaration of Joline Sikora, Feb. 17, 2008, 2 pgs.
Exhibit RX-0524, *In re Matter of Certain Child Carriers, United States International Trade Commission, Inv. No. 337-TA-1154*, Exhibit U to Declaration of Joline Sikora, Feb. 17, 2008, 2 pgs.
Exhibit RX-0525, *In re Matter of Certain Child Carriers, United States International Trade Commission, Inv. No. 337-TA-1154*, Exhibit V to Declaration of Joline Sikora, Jul. 21, 2007-Sep. 19, 2008, 64 pgs.
Exhibit RX-0526, *In re Matter of Certain Child Carriers, United States International Trade Commission, Inv. No. 337-TA-1154*, Exhibit W to Declaration of Joline Sikora, Feb. 27, 2007-Apr. 5, 2009, 41 pgs.
Exhibit RX-0527, *In re Matter of Certain Child Carriers, United States International Trade Commission, Inv. No. 337-TA-1154*, Exhibit A to Declaration of Mischele McEntire, Feb. 17, 2007, 2 pgs.
Exhibit RX-0528, *In re Matter of Certain Child Carriers, United States International Trade Commission, Inv. No. 337-TA-1154*, Exhibit B to Declaration of Mischele McEntire, Feb. 17, 2008, 4 pgs.
Exhibit RX-0539, *In re Matter of Certain Child Carriers, United States International Trade Commission, Inv. No. 337-TA-1154*, LILLEbaby Complete 6 Position Baby Carrier User Manual, Exhibit 613 to Depo of L. Lehan, 16 pgs.
Exhibit RX-0551, *In re Matter of Certain Child Carriers, United States International Trade Commission, Inv. No. 337-TA-1154*, Silly Goose Photos and thread from babywearer.com, Sep. 14, 2007, 14 pgs.
Exhibit RX-0552, *In re Matter of Certain Child Carriers, United States International Trade Commission, Inv. No. 337-TA-1154*, Silly Goose Photos and thread from babywearer.com, Oct. 31, 2007, 15 pgs.

(56) References Cited

OTHER PUBLICATIONS

Respondent's Pre-Hearing Brief, *In re Matter of Certain Child Carriers, United States International Trade Commission, Inv. No. 337-TA-1154*, Nov. 8, 2019, 405 pgs.
Respondent's Post-Hearing Initial Brief, *In re Matter of Certain Child Carriers, United States International Trade Commission, Inv. No. 337-TA-1154*, Jan. 6, 2020, 102 pgs.
Respondent's Post-Hearing Responsive Brief, *In re Matter of Certain Child Carriers, United States International Trade Commission, Inv. No. 337-TA-1154*, Jan. 28, 2020, 127 pgs.
Commission Investigative Staff's Pre-Hearing Brief, *In re Matter of Certain Child Carriers, United States International Trade Commission, Inv. No. 337-TA-1154*, Nov. 20, 2019, 195 pgs.
Commission Investigative Staff's Initial Post-Hearing Brief, *In re Matter of Certain Child Carriers, United States International Trade Commission, Inv. No. 337-TA-1154*, Jan. 13, 2020, 124 pgs.
Commission Investigative Staff's Reply Post-Hearing Brief, *In re Matter of Certain Child Carriers, United States International Trade Commission, Inv. No. 337-TA-1154*, Jan. 22, 2020, 26 pgs.
Complainant's Pre-Hearing Brief, *In re Matter of Certain Child Carriers, United States International Trade Commission, Inv. No. 337-TA-1154*, Nov. 21, 2019, 852 pgs.
Complainant's Post-Hearing Initial Brief, *In re Matter of Certain Child Carriers, United States International Trade Commission, Inv. No. 337-TA-1154*, Jan. 6, 2020, 147 pgs.
Complainant's Post-Hearing Responsive Brief, *In re Matter of Certain Child Carriers, United States International Trade Commission, Inv. No. 337-TA-1154*, Jan. 17, 2020, 85 pgs.
Notice of Commission Determination to Review in Part a Final Initial Determination Finding No Violation of Section 337; Termination of the Investigation, 85 Federal Register 95, at 29484-29485, May 15, 2020, 2 pgs.
Office Action for U.S. Appl. No. 10/937,193, dated Aug. 14, 2007, 9 pgs.
Office Action for U.S. Appl. No. 11/949,324, dated Oct. 6, 2009, 9 pgs.
Office Action for U.S. Appl. No. 11/949,324, dated Apr. 28, 2010, 9 pgs.
International Search Report and Written Opinion for PCT Application No. PCT/US2004/029614, completed on Feb. 11, 2005, dated Mar. 3, 2005, 9 pgs.
International Preliminary Report on Patentability for PCT/US2004/029614, dated Mar. 13, 2006, 7 pgs.
Examination Report for European Application No. 04 783 725.7, dated Sep. 21, 2007, 3 pgs.
Examination Report for European Application No. 04 783 725.7, dated Sep. 9, 2008, 4 pgs.
Examination Report for European Application No. 04 783 725.7, dated Sep. 10, 2009, 3 pgs.
Examination Report for European Application No. 04 783 725.7, dated Dec. 21, 2009, 5 pgs.
Examination Report for European Application No. 04 783 725.7, dated Jun. 1, 2010, 6 pgs.
Office Action for U.S. Appl. No. 11/949,324, dated Oct. 4, 2010, 10 pgs.
Office Action for U.S. Appl. No. 11/949,324, dated Jul. 18, 2011, 14 pgs.
Notice of Opposition filed on Mar. 13, 2012, against European Patent No. EP1765123 B1, 213 pgs.
Declaration of Judy Petterson regarding BabyTrekker with enclosures 1 and 2, dated May 26, 2011, 18 pgs.
International Search Report and Written Opinion for International Application No. PCT/US2014/026378, dated Jul. 21, 2014, 10 pgs.
Office Action for U.S. Appl. No. 14/685,235, dated May 22, 2015, 8 pgs.
International Preliminary Report on Patentability (Ch. I) for International Patent Application No. PCT/US2014/026378, dated Sep. 15, 2015, 6 pgs.
Office Action for U.S. Appl. No. 14/862,933, dated Oct. 30, 2015, 5 pgs.
Office Action for U.S. Appl. No. 14/685,235, dated Nov. 27, 2015, 8 pgs.
International Search Report and Written Opinion for International Patent Application No. PCT/US2016/026626, dated Jun. 30, 2016, 7 pgs.
Office Action for U.S. Appl. No. 15/177,114, dated Aug. 24, 2016, 10 pgs.
Petition for Inter Partes Review of U.S. Pat. No. 9,022,260, 94 pgs.
Petition for Inter Partes Review of U.S. Pat. No. 8,590,757, 100 pgs.
Baby Matey Soft Baby Carriers Literature, Kidpower Unlimited Inc., Toronto, ON, CA, 10 pgs.
BabyTrekker Instruction Manual, Petterson Infant Products, Flin Flon, MB, CA, 1998, 16 pgs.
Declaration of Richard N. Hinrichs, Ph.D and Appendix A thereto for Petition for Inter Partes Review of U.S. Pat. No. 9,022,260, 158 pgs.
Declaration of Richcard N. Hinrichs, Ph.D and Appendix A thereto for Petition for Inter Partes Review of U.S. Pat. No. 8,590,757, 155 pgs.
Declaration of Shari Hall White and Appendix A thereto, Jun. 29, 2016, 12 pgs.
Declaration of Judy Pettersen and Exhibits thereto, Aug. 14, 2016, 50 pgs.
Nov. 24, 1998 Letter from U.S. ITC regarding U.S. tariff classification of babyTrekker, 2 pgs., retrieved from http://www.faqs.org/rulings/rulings1998NYD83381.html).
Feb. 2002 forum post from "USA", 2 pgs., retrieved from http://windsorpeak.com/vbulletin/showthread.php?185543-baby- bjorn-and-large-husband).
U.S. Trademark Serial No. 75057147 Documents, U.S. Patent and Trademark Office, 44 pgs.
Complaint, *The Ergo Baby Carrier, Inc.* v. *BOBA Inc.*, Case No. 2:15-cv-08946, In the United States District Court for the Central District of California, filed Nov. 17, 2015, 7 pgs.
Blaffer Hardy, S., Family Planning Primate Style, Mother Nature—A History of Mothers, Infants and Natural Selection, 2000, pp. 197-204.
Jones, Sandy, Back Packs and Soft Carriers, Guide to Baby Products, Consumers Digest, 1998, Ch. 4, pp. 33-40.
Longe, Jaqueline L., Baby Carrier, How Products are Made: An Illustrated Guide to Product Manufacturing, 2001, vol. 6, pp. 22-26.
Pelot, Ron P., et al., "Background Document for an Advanced Personal Load Carriage System for the Canadian forces", Ergonomics Research Group, Queen's University, Kingston, ON, CA, Mar. 29, 1995, 148 pgs.
Brewer, Gail S., A Quick Guide for Starting Right, Baby Carriers, Right from the Start: Meeting the Challenges of Mothering Your Unborn and Newborn Baby, 1981, pp. 159-160.
Salter, R.B., "Etiology, Pathogenesis and Possible Prevention of Congenital Dislocation of the Hip", The Canadian Medical Association Journal, vol. 98, No. 20, May 18, 1968.
Jones, Sandy, Getting Around, Guide to Baby Products, Consumers Digest, 2001, pp. 41, 55-60, 157-160, 199-201.
Gilligan, Shannon, Best for Baby: A Selective Consumer's Guide to Products and Services from Infancy to Preschool, 1988, pp. 41-46.
O'Donohue, Rosaleen, Baby Rides the Asian Way, The Australian Women's Weekly, Jul. 23, 1969 at p. 9.
Doan, Marlyn, Children's Gear, Starting Small in the Wilderness, The Sierra Club Outdoors Guide for Families, 1979, at pp. 161-167.
Guide to the Ann Moore Innovative Lives Presentation, 1999. Archives Center, National Museum of American History, Smithsonian Institute, Aug. 2010, 12 pgs., retrieved from http://amhistory.si.edu/archives/AC0706.pdf).
Warren, A.J., "The Mom Who Invented the Snugli", CBS News, Mar. 6, 2001, 4 pgs., retrieved from http://www.cbsnews.com/news/the-mom-who-invented-the- snugli/.
Bach, John, "Practical Inventor Influenced American Culture", University of Cincinnati UC Magazine, Aug. 2010, 6 pgs.
"Eager Market for Baby Carrier" The Gazette, Montreal May 15, 1984: C-19 (accessed at https://news.google.com/newspapers?id=zA0vAAAAIBAJ&sjid=mqUFAAAAIBAJ&pg=1454%2C2468510).

(56) References Cited

OTHER PUBLICATIONS

Roseman, E., et al., Baby Carriers, The Canadian Parents' Sourcebook, 1986, at pp. 149-153.
Rafelman, Rachel, The Portable Baby, Baby Gear for the First Year, 1997, pp. 40-41.
Laury, Jean Ray, Baby Carrier, A Treasury of Needlecraft Gifts for the New Baby, 1976, pp. 90-93.
Byrnes, E.A., "A Blue-Jean 'Person Pack': Toting the Tot on the Trail", The Mother Earth News, No. 75, May/Jun. 1982, p. 164.
The Kozy Family, 16 pgs., retrieved from Web Archives of http://www.kozycarrier.homestead.com/.
Packababy, 17 pgs., retrieved from Web Archives of http://www.packababy.com/.
Welcome to Sutemigear, 10 pgs., retrieved from Web Archives of http://sutemigear.com/.
"The Pick of the Extended Trek Packs" Backpacker, Oct. 1997, vol. 23, pp. 58-69.
Jones, Sandy, Back Packs and Soft Carriers, Guide to Baby Products, Consumers Reports, 1991, pp. 9-15.
Baby Trekker—Advantages, 2 pgs., retrieved from https://web.archive.org/web/20000708141511/http://www.babytrekker.com/advantages.htm.
Evenflo Soft Carriers, 2 pgs., retrieved from https://web.archive.org/web/20010331081113/http://www.evenflo.com/ep/furniture/softcarrier.phtml.
Newspaper ad for Napsak Soft Baby Carrier by Evenflow, The Pittsburgh Press (Pittsburgh, Pennsylvania), Thursday, Dec. 12, 1991, p. 57.
Pelot, R.P. et al., "A Static Biomechanical Load Carriage Model", RTO HFM Specialist Meeting on Soldier Mobility Innovation in Load Carriage System Design and Evaluation, Kingston, CA, Jun. 27-29, 2000, 13 pgs.
Knapik, J., "Physiological, Biomechanical and Medical Aspects of Soldier Load Carriage", RTO HFM Specialist Meeting on Soldier Mobility Innovation in Load Carriage System Design and Evaluation, Kingston, CA, Jun. 27-29, 2000, 20 pgs.
Holewijn, M., "Physiological Strain Due to Load Carrying", European Journal of Applied Physiology, 1990, 61:237-245.
Frame Carriers, 1 pg., retrieved from https://web.archive.org/web/20000528184535/http://www.evenflo.com/ep/furniture/framecarrier.phtml.
Aronson, D.D. et al., "Developmental dysplasia of the hip", Pediatrics, Aug. 1994, vol. 94(2), 202, 11 pgs.
Hodgson, A.R., "Congenital Dislocation of the Hip", British Medical Journal, Sep. 7, 1961, p. 647.
Leveau, Barney F., et al., "Developmental biomechanics," Physical Therapy, 64.12, 1984:1878.
The Age, Mar. 5, 1970 at p. 14.
Certified Translation of "What parents should watch out for when buying babywearing carriers" by Kirkiliones, retrieved from http://web.archive.org/web/20010719033113/http://www.continuu m-concept.de/liedkir.htm).
Kirkilionis, E., Das Tragen des Säuglings im Hüftsitz—eine spezielle Anpassung des menschlichen Traglings. Zoologische Jahrbücher, 1992, 96 (3), 395-415.
Kirkilionis, E., Worauf Eltern beim Kauf von Tragehilfen für Säuglinge achten sollten, 1994.
Kirkilionis, E., Die Grundbedürfnisse des Säuglings und deren medizinische Aspekte—dargestellt und charakterisiert am Jungentypus Tragling. notabene medici, 1997, 27 (2), 61-66, 27 (3), 117-121.
Kirkilionis, E., Ein Baby will gatragen sein, 1999, 171 pgs.
"The Beginning" Ergo Baby Blog, 13 pgs., retrieved from https://blog.ergobaby.com/2011/02/the-beginning/).
REI—Kelty Kangaroo Child Carrier, 2 pgs., retrieved from https://web.archive.org/web/19970222133805/http://rei.com/shopping/store3/CAMPING/BABY_CARRIERS/BABY_CARRIERS/b ud/617589.html.
Tough Traveler, Kidsystems, 3 pgs., retrieved from http://web.archive.org/web/20011106132550/http://www.toughtraveler.com/cat7.html.
Mackie, H.W. et al, "The effect of simulated school load carriage configurations on shoulder strap tension forces and shoulder interface pressure", Applied Ergonomics, 36, 2005, pp. 199-206.
Hinrichs, et al., "An Investigation of the Inertial Properties of Backpacks Loaded in Various Configurations", United States Army Natick, Research and Development Laboratories, Natick, MA, 1982, 75 pgs.
Nelson, et al., "Effects of Gender, Load, and Backpack on Easy Standing and Vertical Jump Performance Volume II", United States Army Natick, Research and Development Laboratories, Natick, MA, Mar. 1982, 77 pgs.
Martin, et al., "Effects of Gender, Load, and Backpack on the Temporal and Kinematic Characteristics of Walking Gait Volume III", United States Army Natick, Research and Development Laboratories, Natick, MA, Apr. 1982, 77 pgs.
Martin, et al., "A Mathematical Model of the Inertial Properties of a Carrier-Backpack System Volume IV", United States Army Natick, Research and Development Laboratories, Natick, MA, May 1982, 89 pgs.
Definition of "flexed", Random House Webster's Unabridged Dictionary, Oct. 1999, Second Edition, p. 733.
Rose, Marion, Baby Carriers—Cultural History, Aware Parenting, Dec. 8, 2006, 11 pgs., retrieved from http://awareparenting.blogspot.com/2006/12/baby-carriers-cultural-history.html.
European Search Report for European Application No. 14773586.4, dated Oct. 16, 2016, 9 pgs.
International Search Report and Written Opinion for International Patent Application No. PCT/US2016/059534, dated Jan. 3, 2017, 8 pgs.
Holewijn, Michael, "Physiological Strain Due to Load Carrying," European Journal of Applied Physiology and Occupational Physiology, Feb. 1990, 10 pgs.
BabyTrekker Instruction Manual, Pettersen Infant Products, Canada, 1998, 16 pgs.
BabyTrekker Instruction Manual, Pettersen Infant Products, Canada, 16 pgs.
Casses, R., "Infant Carriers and Spinal Stress," <<http://continuum-concept.org/reading/spinalstress.html>>, Jun. 16, 2002, 3 pgs.
Jones, S., "Guide to Baby Products," Consumer Reports, Completely Revised Seventh Edition, 2001, 21 pgs.
<<http://www.kelty.com/Kelty/index.cfm?fuseaction=Kids.ShowProduct&type=carrier&ID=12>>, Aug. 5, 2002, 1 page.
"Kwik Sew," Pattern 1046, Kwik Sew Pattern Co., Inc., Minneapolis, MN, 8 pgs.
Declaration of Judy Pettersen regarding BabyTrekker, May 26, 2011, 18 pgs.
"The Baby Trekker Product Info," <<http://www.babytrekker.com/product.htm>>, Jun. 10, 2002, 1 page.
"The Baby Trekker Testimonials," <<http://www.babytrekker.com/testimonials.htm>>, Dec. 21, 2001, 4 pgs.
"The Baby Trekker Testimonials," <<http://www.babytrekker.com/testimonials.htm>>, Sep. 16, 2002, 4 pgs.
"Baby/Toddler Sling," <<http://www3.telus.net/public/a6a83106/Sling/sling.html>>, Nov. 19, 2003, 5 pgs.
"First Journey Advantages," <<http://www.first-journey.com/advantage1pics/advantages1.html>>, Dec. 14, 2002, 1 page.
"First Journey Advantages," <<http://www.first-journey.com/advantage2pics/advantages2.html>>, Dec. 14, 2002, 1 page.
"First Journey instructions," <<http://www.first-journey.com/instructions/instructions>>, Dec. 14, 2002, 1 page.
"First Journey Photos & Quotes," <<http://www.first-journey.com/photosandquotes/photos>>, Dec. 14, 2002, 2 page.
First Journey Brochure, <<www.first-journey.com>>, 2002, 2 pgs.
<<http://koti.welho.com/skoivune/sakara/english/about/index.html>>, Apr. 30, 2003, 2 pgs.
<<http://koti.welho.com/skoivune/sakara/english/index.html>>, Jun. 24, 2003, 2 pgs.
<<http://koti.welho.com/skoivune/sakara/english/guide/index.html>>, Jun. 28, 2003, 1 page.
<<http://koti.welho.com/skoivune/sakara/english/guide/ohje2.html>>, May 1, 2003, 1 page.
<<http://koti.welho.com/skoivune/sakara/english/guide/ohje3.html>>, May 1, 2003, 1 page.

(56) References Cited

OTHER PUBLICATIONS

<<http://koti.welho.com/skoivune/sakara/ohje/ohje4.html>>, May 2, 2003, 1 page.
<<http://koti.welho.com/skoivune/sakara/ohje/ohje6.html>>, May 29, 2003, 1 page.
<<http://koti.welho.com/skoivune/sakara/ohje/ohje7.html>>, May 9, 2003, 1 page.
<<http://koti.welho.com/skoivune/sakara/english/order/index.html>>, Apr. 30, 2003, 1 page.
<<http://koti.welho.com/skoivune/sakara/index2.html>>, Jun. 20, 2003, 2 pgs.
<<http://koti.welho.com/skoivune/sakara/sakarat/index.html>>, Apr. 30, 2003, 2 pgs.
Weego Soft Baby Carrier, Instructions for Use, Weego Babytragesäcke, Berlin, DE, 4 pgs.
<<http://www.weego.com/coinf.html>>, Aug. 6, 2002, 2 pgs.
<<http://www.weego.com/product.html>>, Dec. 11, 2001, 1 page.
<<http://www.weego.com/fabric.html>>, Nov. 2, 2001, 2 pgs.
<<http://www.weego.com/preem.html>>, Aug. 6, 2002, 2 pgs.
<<http://www.weego.com/acatalog/ool.html>>, Jun. 5, 2002, 3 pgs.
<<http://www.weego.de/024.htm>>, Aug. 12, 2003, 1 page.
<<http://www.weego.de/english/024.htm>>, Apr. 23, 2004, 1 page.
<<http://www.weego.de/english/ortho.htm>>, Jun. 1, 2004, 1 page.
<<http://www.weego.de/english/design.htm>>, Mar. 24, 2004, 1 page.
<<http://www.weego.de/english/interaktiv.htm>>, Jul. 3, 2004, 1 page.
<<http://www.weego.de/english/trageposition.htm>>, Apr. 23, 2004, 1 page.
"6 in One Rider," Infantino, LLC, San Diego, California, 2002, 1 page.
Assorted Photos, U.S. Appl. No. 60/501,396, filed Sep. 10, 2003, 3 pgs.
Wormleighton, A., "Baby Gifts: To Sew, Applique, Crochet and Knit," Copyright Marshall Cavendish Limited, 1998, 13 pgs.
"Baby Pack Baby Carrier," <<http://www.beginnings.org/shop/buikrugdragers_babypack.htm>>, Feb. 4, 2002, 1 page.
"Baby Trekker Instruction Sheet," 2 pgs.
Constance, S., "Backpacking the Baby," Sydney Morning Herald, Dec. 1, 1998, 3 pgs.
File History for U.S. Appl. No. 14/685,235, filed Apr. 13, 2015, 460 pgs.
"Chinese Baby Carrier," <<http://portebebe.free.fr>>, Jun. 2002, 7 pgs.
Coff, H., "Cut Scheduling for Optimum Fabric Utilization in Apparel Production," Georgia Institute of Technology, Nov. 1976, 141 pgs.
"Baby Matey, Soft Baby Carriers," Copyright Kidpower Unlimited Inc., 4 pgs.
"Theodore Bean Infants & Toddlers Carriers & Accessories," Theodore Bean Adventure Company Inc., 2000, 16 pgs.
"Clinical Practice Guideline: Early Detection of Developmental Dysplasia of the Hip," American Academy of Pediatrics vol. 105, No. 4, Apr. 2000, 10 pgs.
File History for European Patent Application No. 04783725.7, filed Sep. 10, 2004, 693 pgs.
"First Journey Visite Guidée," Pettersen Infant Products, www.first-journey.com, 2004, 2 pgs.
"First Journey Tour Guide," Pettersen Infant Products, www.first-journey.com, 2002, 2 pgs.
"Graco Soft Carrier Owner's Manual, Model 5070 Series," Graco Children's Products, Inc., 1999, 7 pgs.
Jones et al., "Guide to Baby Products," Consumer Reports Books, Fourth Edition, Dec. 1995, 10 pgs.
Harman et al., "The Effects of Backpack Weight on the Biomechanics of Load Carriage," Military Division, U.S. Army Research Institute of Environmental Medicine, May 3, 2000, 72 pgs.
"In & Out Carrier Instructions," Hauck Fun for Kids, 2003, 3 pgs.
"In & Out Carrier Instructions," Hauck Fun for Kids, Aug. 2003, 3 pgs.
"Wearing Your Baby," <<http://wearingyourbaby.co.nz/history>>, 2014, 11 pgs.
Longe, J., "How Products are Made: An Illustrated Guide to Product Manufacturing," 2001, vol. 6, 8 pgs.
"GVP Gear G4," <<http://www.gvpgear.com/g4.asp>>, Jun. 2, 2002, 3 pgs.
"Backpack Tips," <<http://backpacking.net/gearpack-tips.html>>, Jun. 2, 2002, 6 pgs.
"Make Your Own G4 Pack," <<http://www.gvogear.com/make_your_own.asp>>, Jun. 2, 2002, 17 pgs.
King, F.H, "Farmers of forty Centuries," Copyright 2002 Blackmask Online, www.blackmask.com, 118 pgs.
"Worauf Eltern beim Kauf von Tragehilfen fuer Sauglinge achten sollten—Things parents shopping for infant carriers should look out for," <<http://www.continuum-concept.de/liedkir.htm>>, Jul. 19, 2001, 4 pgs.
"Lifter Baby Carrier," <<http://www.beginnings.org/shop/buikheuprugdragers_lifter.htm>>, Jun. 19, 2002, 2 pgs.
"Ultralight Pack," <<http://www.backpacking.net/makegear/gvp-pack/>>, Mar. 1, 2003, 29 pgs.
Martin, J. and Hooper, R., "Military Load Carriage: A Novel Method of Interface Pressure Analysis," RTO HFM Specialists' Meeting on "Soldier Mobility: Innovations in Load Carriage System Design and Evaluation," Jun. 27-29, 2000, 9 pgs.
"Miguel Inspired Originals," <<http://miguelinspired.com/about.html>>, Oct. 30, 2005, 2 pgs.
"Miguel Inspired Originals," <<http://miguelinspired.com/gpage2.html>>, Oct. 30, 2005, 5 pgs.
"Miguel Inspired Originals," <<http://miguelinspired.com/gpage.html>>, Oct. 30, 2005, 2 pgs.
"Miguel Inspired Originals," <<http://miguelinspired.com/gpage3.html>>, Oct. 30, 2005, 1 page.
"The Australian Women's Weekly," vol. 37, No. 8, Jul. 23, 1969, 80 pgs.
"For Shane Gould Innes—Motherhood is a Mind," The Australian Women's Weekly, <<National library of Australia—http://nla.gov.au/nla-news-page5623013>>, Oct. 11, 1978, 1 page.
". . . Blowing Experience," The Australian Women's Weekly, <<National library of Australia—http://nla.gov.au/nla-news-page5623014>>, Oct. 11, 1978, 1 page.
Cessnock Eagle and South Mattland Recorder, vol. 32, No. 4162, Jun. 22, 1944, <<National library of Australia—http://nla.gov.au/nla-news-page10625124>>, 1 page.
File History for U.S. Appl. No. 10/937,193, filed Sep. 9, 2004, 135 pgs.
"Porte-bébé chinois," <<http://portebebe.free.fr/>>, Jun. 5, 2002, 6 pgs.
U.S. Appl. No. 60/501,396, filed Sep. 10, 2003, 9 pgs.
"Device for Worn Baby," Patent Translate Description of Russian Application No. RU12646, 3 pgs.
Santa Cruz Sentinel, <<https://www.newspapers.com/image/7139712>>, Jul. 26, 1987, 1 page.
Krantz, L. and Ludman-Exley, S., "The Best of Everything for Your Baby," Copyright 2000 by Prentice Hall, Inc., 18 pgs.
"Home Watch," The Sydney Morning Herald, <<https://www.newspapers.com/image/123957115>>, Jan. 10, 1993, 1 page.
Chancellor, N., "It's a Shoulder Style," The Sydney Morning Herald, <<https://www.newspapers.com/image/123869066>>, Jun. 24, 1947, 1 page.
Constance, M., "Backpacking the Baby," The Sydney Morning Herald, <<https://www.newspapers.com/image/120542968>>, Dec. 1, 1988, 1 page.
Gebrauchsanweisung (User's Manual), Weego Baby Carrier, 4 pgs.
"Why Choose the Wilkinet?," <<http://www.wilkinet.co.uk/WhyChoose.asp>>, Apr. 17, 2003, 2 pgs.
Wilkinet—FAQ, <<http://www.wilkinet.co.uk/FAQs.asp>>, Feb. 17, 2003, 3 pgs.
Wilkinet—History of the Wilkinet Baby Carrier, <<http://www.wilkinet.co.uk/History.asp>>, Feb. 17, 2003, 3 pgs.
Wilkinet—Reviews and Testimonials, <<http://www.wilkinet.co.uk/ReviewsParents.asp>>, Feb. 18, 2003, 2 pgs.
Wilkinet—Reviews and Testimonials, <<http://www.wilkinet.co.uk/ReviewsPress.asp>>, Feb. 18, 2003, 2 pgs.

(56) References Cited

OTHER PUBLICATIONS

Wilkinet—Product Views, <<http://www.wilkinet.co.uk/BabyCarriers.asp>>, Feb. 17, 2003, 2 pgs.
Wilkinet—Instructional Videos, <<http://www.wilkinet.co.uk/Videos.asp>>, Feb. 18, 2003, 2 pgs.
Appendix A: Baby Matey Non-Patent Literature as Cited on the Face of U.S. Pat. No. 4,986,458 ("Baby Matey Literature") Invalidity Chart, *The Ergo Baby Carrier, Inc.* v. *BOBA Inc.*, Case No. 2:15-cv-08946, In the United States District Court for the Central District of California, Jul. 15, 2016, 21 pgs.
Appendix BB: Consumer Reports Guide to Baby Products by Sandy Jones, published in 2001 ("Guide to Baby Products") Invalidity Chart, *The Ergo Baby Carrier, Inc.* v. *BOBA Inc.*, Case No. 2:15-cv-08946, In the United States District Court for the Central District of California, Jul. 15, 2016, 11 pgs.
Appendix AAA: Japanese Pub. No. S54-108131 ("The '131 Patent") Invalidity Chart, *The Ergo Baby Carrier, Inc.* v. *BOBA Inc.*, Case No. 2:15-cv-08946, In the United States District Court for the Central District of California, Jul. 15, 2016, 11 pgs.
Appendix B: Baby Matey System Invalidity Chart, *The Ergo Baby Carrier, Inc.* v. *BOBA Inc.*, Case No. 2:15-cv-08946, In the United States District Court for the Central District of California, Jul. 15, 2016, 22 pgs.
Appendix BB: U.S. Pat. No. 3,780,919 ("Hansson") Invalidity Chart, *The Ergo Baby Carrier, Inc.* v. *BOBA Inc.*, Case No. 2:15-ov-08946, In the United States District Court for the Central District of California, Jul. 15, 2016, 4 pgs.
Appendix BBB: UK Patent App. No. GB 2026848 ("David") Invalidity Chart, *The Ergo Baby Carrier, Inc.* v. *BOBA Inc.*, Case No. 2:15-cv-08946, In the United States District Court for the Central District of California, Jul. 15, 2016, 5 pgs.
Appendix C: Canadian Patent No. 1332928 ("Pettersen") Invalidity Chart, *The Ergo Baby Carrier, Inc.* v. *BOBA Inc.*, Case No. 2:15-cv-08946, In the United States District Court for the Central District of California, Jul. 15, 2016, 18 pgs.
Appendix CC: "Physiological Strain Due to Load Carrying" by Michael Holewijn, published in European Journal of Applied Physiology and Occupational Physiology, Feb. 1990 ("Holewijn") Invalidity Chart, *The Ergo Baby Carrier, Inc.* v. *BOBA Inc.*, Case No. 2:15-cv-08946, In the United States District Court for the Central District of California, Jul. 15, 2016, 12 pgs.
Appendix CCC: DIY Baby Sling System Invalidity Chart, *The Ergo Baby Carrier, Inc.* v. *BOBA Inc.*, Case No. 2:15-cv-08946, In the United States District Court for the Central District of California, Jul. 15, 2016, 11 pgs.
Appendix D: babyTrekker Instruction Manual copyright date stamped 1998 ("1998 babyTrekker Manual") Invalidity Chart, *The Ergo Baby Carrier, Inc.* v. *BOBA Inc.*, Case No. 2:15-cv-08946, In the United States District Court for the Central District of California, Jul. 15, 2016, 19 pgs.
Appendix DD: Kelty Kangaroo Invalidity Chart, *The Ergo Baby Carrier, Inc.* v. *BOBA Inc.*, Case No. 2:15-cv-08946, In the United States District Court for the Central District of California, Jul. 15, 2016, 7 pgs.
Appendix DDD: Kozy System Invalidity Chart, *The Ergo Baby Carrier, Inc.* v. *BOBA Inc.*, Case No. 2:15-cv-08946, In the United States District Court for the Central District of California, Jul. 15, 2016, 16 pgs.
Appendix E: babyTrekker Instruction Manual ("babyTrekker Manual") Invalidity Chart, *The Ergo Baby Carrier, Inc.* v. *BOBA Inc.*, Case No. 2:15-cv-08946, In the United States District Court for the Central District of California, Jul. 15, 2016, 21 pgs.
Appendix EE: Kirkiliones Invalidity Chart, *The Ergo Baby Carrier, Inc.* v. *BOBA Inc.*, Case No. 2:15-cv-08946, In the United States District Court for the Central District of California, Jul. 15, 2016, 9 pgs.
Appendix EEE: Packababy System Invalidity Chart, *The Ergo Baby Carrier, Inc.* v. *BOBA Inc.*, Case No. 2:15-cv-08946, In the United States District Court for the Central District of California, Jul. 15, 2016, 17 pgs.
Appendix F: babyTrekker System Invalidity Chart, *The Ergo Baby Carrier, Inc.* v. *BOBA Inc.*, Case No. 2:15-cv-08946, In the United States District Court for the Central District of California, Jul. 15, 2016, 16 pgs.
Appendix FF: "Physicological, Biomechanical and Medical Aspects of Soldier Load Carriage" by Joseph Knapik, Presented in Jun. 2000 ("Knapik") Invalidity Chart, *The Ergo Baby Carrier, Inc.* v. *BOBA Inc.*, Case No. 2:15-cv-08946, In the United States District Court for the Central District of California, Jul. 15, 2016, 11 pgs.
Appendix FFF: Sakara System Invalidity Chart, *The Ergo Baby Carrier, Inc.* v. *BOBA Inc.*, Case No. 2:15-cv-08946, In the United States District Court for the Central District of California, Jul. 15, 2016, 17 pgs.
Appendix G: First Journey System Invalidity *The Ergo Baby Carrier, Inc.* v. *BOBA Inc.*, Case No. 2:15-cv-08946, In the United States District Court for the Central District of California, Jul. 15, 2016, 21 pgs.
Appendix GG: U.S. Pat. No. 4,434,920 ("Moore") Invalidity Chart, *The Ergo Baby Carrier, Inc.* v. *BOBA Inc.*, Case No. 2:15-cv-08946, In the United States District Court for the Central District of California, Jul. 15, 2016, 6 pgs.
Appendix GGG: Sutemi System Invalidity Chart, *The Ergo Baby Carrier, Inc.* v. *BOBA Inc.*, Case No. 2:15-cv-08946, In the United States District Court for the Central District of California, Jul. 15, 2016, 12 pgs.
Appendix H: French Patent Pub. No. 2795010 ("Ducruet") Invalidity Chart, *The Ergo Baby Carrier, Inc.* v. *BOBA Inc.*, Case No. 2:15-cv-08946, In the United States District Court for the Central District of California, Jul. 15, 2016, 8 pgs.
Appendix HH: "A Static Biomechanical Load Carriage Model" by R.P. Pelot et al., Presented in Jun. 2000 ("Pelot") Invalidity Chart, *The Ergo Baby Carrier, Inc.* v. *BOBA Inc.*, Case No. 2:15-cv-08946, In the United States District Court for the Central District of California, Jul. 15, 2016, 13 pgs.
Appendix HHH: Casses Invalidity Chart, *The Ergo Baby Carrier, Inc.* v. *BOBA Inc.*, Case No. 2:15-cv-08946, In the United States District Court for the Central District of California, Jul. 15, 2016, 5 pgs.
Appendix I: U.S. Pat. No. 4,986,458 ("Linday") Invalidity Chart, *The Ergo Baby Carrier, Inc.* v. *BOBA Inc.*, Case No. 2:15-cv-08946, In the United States District Court for the Central District of California, Jul. 15, 2016, 16 pgs.
Appendix II: Pony Ride Invalidity Chart, *The Ergo Baby Carrier, Inc.* v. *BOBA Inc.*, Case No. 2:15-cv-08946, In the United States District Court for the Central District of California, Jul. 15, 2016, 7 pgs.
Appendix III: U.S. Pat. No. 6,182,873 ("Christopher") Invalidity Chart, *The Ergo Baby Carrier, Inc.* v. *BOBA Inc.*, Case No. 2:15-cv-08946, In the United States District Court for the Central District of California, Jul. 15, 2016, 2 pgs.
Appendix J: U.S. Pat. No. 4,469,259 ("Krich") Invalidity Chart, *The Ergo Baby Carrier, Inc.* v. *BOBA Inc.*, Case No. 2:15-cv-08946, In the United States District Court for the Central District of California, Jul. 15, 2016, 8 pgs.
Appendix JJ: U.S. Pat. No. 5,114,059 ("Thatcher") Invalidity Chart, *The Ergo Baby Carrier, Inc.* v. *BOBA Inc.*, Case No. 2:15-cv-08946, In the United States District Court for the Central District of California, Jul. 15, 2016, 4 pgs.
Appendix JJJ: U.S. Pat. No. 6,155,579 ("Eyman") Invalidity Chart, *The Ergo Baby Carrier, Inc.* v. *BOBA Inc.*, Case No. 2:15-cv-08946, In the United States District Court for he Central District of California, Jul. 15, 2016, 2 pgs.
Appendix K: "A Blue-Jean Person Pack," by E.A. Byrnes as published on p. 164 of the May/Jun. 1982 issue of The Mother Earth News ("Byrnes") Invalidity Chart, *The Ergo Baby Carrier, Inc.* v. *BOBA Inc.*, Case No. 2:15-cv-08946, In the United States District Court for the Central District of California, Jul. 15, 2016, 21 pgs.
Appendix KK: Weego System Invalidity Chart, *The Ergo Baby Carrier, Inc.* v. *BOBA Inc.*, Case No. 2:15-cv-08946, In the United States District Court for the Central District of California. Jul. 15, 2016, 20 pgs.

(56) References Cited

OTHER PUBLICATIONS

Appendix KKK: U.S. Pat. No. 5,848,741 ("Fair") Invalidity Chart, *The Ergo Baby Carrier, Inc.* v. *BOBA Inc.*, Case No. 2:15-cv-08946, In the United States District Court for the Central District of California, Jul. 15, 2016, 2 pgs.
Appendix L: EP Patent No. 0437365 ("Gunderman") Invalidity Chart, *The Ergo Baby Carrier, Inc.* v. *BOBA Inc.*, Case No. 2:15-cv-08946, In the United States District Court for the Central District of California, Jul. 15, 2016, 14 pgs.
Appendix LL: U.S. Pat. No. 6,257,468 ("Yamazoe") Invalidity Chart, *The Ergo Baby Carrier, Inc.* v. *BOBA Inc.*, Case No. 2:15-cv-08946, In the United States District Court for the Central District of California, Jul. 15, 2016, 4 pgs.
Appendix LLL: Consumer Reports Guide to Baby Products by Sandy Jones, published in 2001 ("Guide to Baby Products") Invalidity Chart, *The Ergo Baby Carrier, Inc.* v. *BOBA Inc.*, Case No. 2:15-cv-08946, In the United States District Court for the Central District of California, Jul. 15, 2016, 8 pgs.
Appendix M: Kwik Sew Pattern No. 1046 ("Kwik Sew") Invalidity Chart, *The Ergo Baby Carrier, Inc.* v. *BOBA Inc.*, Case No. 2:15-cv-08946, In the United States District Court for the Central District of California, Jul. 15, 2016, 18 pgs.
Appendix MM: Baby Matey Literature as Cited on the Face of U.S. Pat. No. 4,986,458 ("Baby Matey Literature") Invalidity Chart, *The Ergo Baby Carrier, Inc.* v. *BOBA Inc.*, Case No. 2:15-cv-08946, In the United States District Court for the Central District of California, Jul. 15, 2016, 20 pgs.
Appendix MMM: U.S. Pat. No. 3,780,919 ("Hansson") Invalidity Chart, *The Ergo Baby Carrier, Inc.* v. *BOBA Inc.*, Case No. 2:15-cv-08946, In the United States District Court for the Central District of California, Jul. 15, 2016, 2 pgs.
Appendix N: Japanese Pub. No. S53-155443 ("The '443 Patent") Invalidity Chart, *The Ergo Baby Carrier, Inc.* v. *BOBA Inc.*, Case No. 2:15-cv-08946, In the United States District Court for the Central District of California, Jul. 15, 2016, 12 pgs.
Appendix NN: Baby Matey System Invalidity Chart, *The Ergo Baby Carrier, Inc.* v. *BOBA Inc.*, Case No. 2:15-cv-08946, In the United States District Court for the Central District of California, Jul. 15, 2016, 22 pgs.
Appendix NNN: "Physiological Strain Due to Load Carrying" by Michael Holewijn, published in European Journal of Applied Physiology and Occupational Physiology, Feb. 1990 ("Holewijn") Invalidity Chart, *The Ergo Baby Carrier, Inc.* v. *BOBA Inc.*, Case No. 2:15-cv-08946, In the United States District Court for the Central District of California, Jul. 15, 2016, 11 pgs.
Appendix O: Japanese Patent Pub. No. S54-108131 ("The '131 Patent") Invalidity Chart, *The Ergo Baby Carrier, Inc.* v. *BOBA Inc.*, Case No. 2:15-cv-08946, In the United States District Court for the Central District of California, Jul. 15, 2016, 13 pgs.
Appendix OO: Canadian Patent No. 1332928 ("Pettersen") Invalidity Chart, *The Ergo Baby Carrier, Inc.* v. *BOBA Inc.*, Case No. 2:15-cv-08946, In the United States District Court for the Central District of California, Jul. 15, 2016, 16 pgs.
Appendix OOO: Kelty Kangaroo Invalidity Chart, *The Ergo Baby Carrier, Inc.* v. *BOBA Inc.*, Case No. 2:15-cv-08946, In the United States District Court for the Central District of California, Jul. 15, 2016, 4 pgs.
Appendix P: U.S. Pat. No. 4,009,808 ("Sharp") Invalidity Chart, *The Ergo Baby Carrier, Inc.* v. *BOBA Inc.*, Case No. 2:15-cv-08946, In the United States District Court for the Central District of California, Jul. 15, 2016, 5 pgs.
Appendix PP: babyTrekker Instruction Manual copyright date stamped 1998 ("1998 babyTrekker Manual") Invalidity Chart, *The Ergo Baby Carrier, Inc.* v. *BOBA Inc.*, Case No. 2:15-cv-08946, In the United States District Court for the Central District of California, Jul. 15, 2016, 16 pgs.
Appendix PPP: Kirkiliones Invalidity Chart, *The Ergo Baby Carrier, Inc.* v. *BOBA Inc.*, Case No. 2:15-cv-08946, In the United States District Court for the Central District of California, Jul. 15, 2016, 9 pgs.
Appendix Q: UK Patent App. No. GB 2026848 ("David") Invalidity Chart, *The Ergo Baby Carrier, Inc.* v. *BOBA Inc.*, Case No. 2:15-cv-08946, In the United States District Court for the Central District of California, Jul. 15, 2016, 8 pgs.
Appendix QQ: babyTrekker Instruction Manual ("babyTrekker Manual") Invalidity Chart, *The Ergo Baby Carrier, Inc.* v. *BOBA Inc.*, Case No. 2:15-cv-08946, In the United States District Court for the Central District of California, Jul. 15, 2016, 17 pgs.
Appendix QQQ: "Physiological, Biomechanical and Medical Aspects of Soldier Load Carriage" by Joseph Knapik, presented in Jun. 2000 ("Knapik") Invalidity Chart, *The Ergo Baby Carrier, Inc.* v. *BOBA Inc.*, Case No. 2:15-cv-08946, In the United States District Court for the Central District of California, Jul. 15, 2016, 10 pgs.
Appendix R: DIY Baby Sling System Invalidity Chart, *The Ergo Baby Carrier, Inc.* v. *BOBA Inc.*, Case No. 2:15-cv-08946, In the United States District Court for the Central District of California, Jul. 15, 2016, 13 pgs.
Appendix RR: babyTrekker System Invalidity Chart, *The Ergo Baby Carrier, Inc.* v. *BOBA Inc.*, Case No. 2:15-cv-08946, In the United States District Court for the Central District of California, Jul. 15, 2016, 14 pgs.
Appendix RRR: U.S. Pat. No. 4,434,920 ("Moore") Invalidity Chart, *The Ergo Baby Carrier, Inc.* v. *BOBA Inc.*, Case No. 2:15-cv-08946, In the United States District Court for the Central District of California, Jul. 15, 2016, 2 pgs.
Appendix S: Kozy System Invalidity Chart, *The Ergo Baby Carrier, Inc.* v. *BOBA Inc.*, Case No. 2:15-cv-08946, In the United States District Court for the Central District of California, Jul. 15, 2016, 18 pgs.
Appendix SS: First Journey System Invalidity Chart, *The Ergo Baby Carrier, Inc.* v. *BOBA Inc.*, Case No. 2:15-cv-08946, In the United States District Court for the Central District of California, Jul. 15, 2016, 18 pgs.
Appendix SSS: "A Static Biomechanical Load Carriage Model" by R.P. Pelot et al., Presented in Jun. 2000 ("Pelot") Invalidity Chart, *The Ergo Baby Carrier, Inc.* v. *BOBA Inc.*, Case No. 2:15-cv-08946, In the United States District Court for the Central District of California, Jul. 15, 2016, 11 pgs.
Appendix T: Packababy System Invalidity Chart, *The Ergo Baby Carrier, Inc.* v. *BOBA Inc.*, Case No. 2:15-cv-08946, In the United States District Court for the Central District of California, Jul. 15, 2016, 19 pgs.
Appendix TT: French Patent Pub. No. 2794010 ("Ducruet") Invalidity Chart, *The Ergo Baby Carrier, Inc.* v. *BOBA Inc.*, Case No. 2:15-cv-08946, In the United States District Court for the Central District of California, Jul. 15, 2016, 5 pgs.
Appendix TTT: Pony Ride Invalidity Chart, *The Ergo Baby Carrier, Inc.* v. *BOBA Inc.*, Case No. 2:15-cv-08946, In the United States District District of California, Jul. 15, 2016, 4 pgs.
Appendix U: Sakara System Invalidity Chart, *The Ergo Baby Carrier, Inc.* v. *BOBA Inc.*, Case No. 2:15-cv-08946, In the United States District Court of the Central District of California, Jul. 15, 2016, 18 pgs.
Appendix UU: U.S. Pat. No. 4,986,458 ("Linday") Invalidity Chart, *The Ergo Baby Carrier, Inc.* v. *BOBA Inc.*, Case No. 2:15-cv-08946, In the United States District Court for the Central District of California, Jul. 15, 2016, 15 pgs.
Appendix UUU: U.S. Pat. No. 5,114,059 ("Thatcher") Invalidity Chart, *The Ergo Baby Carrier, Inc.* v. *BOBA Inc.*, Case No. 2:15-cv-08946, In the United States District Court for the Central District of California, Jul. 15, 2016, 3 pgs.
Appendix V: Sutemi System Invalidity Chart, *The Ergo Baby Carrier, Inc.* v. *BOBA Inc.*, Case No. 2:15-cv-08946, In the United States District Court for the Central District of California, Jul. 15, 2016, 14 pgs.
Appendix VV: U.S. Pat. No. 4,469,259 ("Krich") Invalidity Chart, *The Ergo Baby Carrier, Inc.* v. *BOBA Inc.*, Case No. 2:15-cv-08946, In the United States District Court for the Central District of California, Jul. 15, 2016, 5 pgs.
Appendix VVV: Weego System Invalidity Chart, *The Ergo Baby Carrier, Inc.* v. *BOBA Inc.*, Case No. 2:15-cv-08946, In the United States District Court for the Central District of California, Jul. 15, 2016, 18 pgs.

(56) References Cited

OTHER PUBLICATIONS

Appendix W: Casses Invalidity Chart, *The Ergo Baby Carrier, Inc.* v. *BOBA Inc.*, Case No. 2:15-cv-08946, In the United States District Court for the Central District of California, Jul. 15, 2016, 6 pgs.
Appendix WW: "A Blue-Jean Person Pack" by E.A. Byrnes as published on p. 164 of the May/Jun. 1982 issue of The Mother Earth News ("Byrnes") Invalidity Chart, *The Ergo Baby Carrier, Inc.* v. *BOBA Inc.*, Case No. 2:15-cv-08946, In the United States District Court for the Central District of California, Jul. 15, 2016, 17 pgs.
Appendix WWW: U.S. Pat. No. 6,257,468 ("Yamazoe") Invalidity Chart, *The Ergo Baby Carrier, Inc.* v. *BOBA Inc.*, Case No. 2:15-cv-08946, In the United States District Court for the Central District of California, Jul. 15, 2016, 2 pgs.
Appendix X: U.S. Pat. No. 6,182,873 ("Christopher") Invalidity Chart, *The Ergo Baby Carrier, Inc.* v. *BOBA Inc.*, Case No. 2:15-cv-08946, In the United States District Court for the Central District of California, Jul. 15, 2016, 4 pgs.
Appendix XX: EP Patent No. 0437365 ("Gunderman") Invalidity Chart, *The Ergo Baby Carrier, Inc.* v. *BOBA Inc.*, Case No. 2:15-cv-08946, In the United States District Court for the Central District of California, Jul. 15, 2016, 14 pgs.
Appendix Y: U.S. Pat. No. 6,155,579 ("Eyman") Invalidity Chart, *The Ergo Baby Carrier, Inc.* v. *BOBA Inc.*, Case No. 2:15-cv-08946, In the United States District Court for the Central District of California, Jul. 15, 2016, 4 pgs.
Appendix YY: Kwik Sew Pattern No. 1046 ("Kwik Sew") Invalidity Chart, *The Ergo Baby Carrier, Inc.* v. *BOBA Inc.*, Case No. 2:15-cv-08946, In the United States District Court for the Central District of California, Jul. 15, 2016, 16 pgs.
Appendix Z: U.S. Pat. No. 5,848,741 ("Fair") Invalidity Chart, *The Ergo Baby Carrier, Inc.* v. *BOBA Inc.*, Case No. 2:15-cv-08946, In the United States District Court for the Central District of California, Jul. 15, 2016, 4 pgs.
Appendix ZZ: Japanese Patent Publication No. S53-155443 ("The '443 Patent") Invalidity Chart, *The Ergo Baby Carrier, Inc.* v. *BOBA Inc.*, Case No. 2:15-cv-08946, In the United States District Court for the Central District of California, Jul. 15, 2016, 10 pgs.
Tentative Ruling on Claim Construction, U.S. Pat. Nos. 8,590,757 and 9,022,260, *The Ergo Baby Carrier, Inc.* v. *BOBA Inc.*, Case No. 2:15-cv-08946, In the United States District Court for the Central District of California, Dec. 1, 2016, 11 pgs.
File History for U.S. Trademark Application No. 75/457,187, filed Mar. 25, 1998, 56 pgs.
"Kinderpack Wearing Instructions for Infant Size," <<https://mykinderpack.com/pages/instructions>>, Copyright 2017 Kindercarry, 5 pgs.
"Kinderpack Wearing Instructions for Toddler Size," <<https://mykinderpack.com/pages/instructions>>, Copyright 2017 Kindercarry, 5 pgs.
SSC Instructions, <<http://www.isara.ro/en/content/7-instructiuni-ssc>>, Copyright 2016 ISARA, 12 pgs.
Wrapping instructions Baby Carriers, <<http://www.kokadi.de/en/instruction:_:162.html>>, Copyright 2016 ISARA, 28 pgs.
"The Five Hidden Features of the Yemaya Baby Carrier," <<http://http://blog.cybex-online.com/blog/safety/the-five-hidden-features-of-the-yemaya-baby-carrier/>>, Oct. 13, 2016 ISARA, 7 pgs.
Preliminary Invalidity Contentions, *The Ergo Baby Carrier, Inc.* v. *BOBA Inc.*, Case No. 2:15-cv-08946, In the United States District Court for the Central District of California, Jul. 15, 2016, 18 pgs.
BOBA, Inc.'s First Amended Counterclaims for Declaration of Unenforceability, Invalidity, and Monopolization, *The Ergo Baby Carrier, Inc.* v. *BOBA Inc.*, Case No. 2:15-cv-08946, In the United States District Court for the Central District of California, May 23, 2016, 73 pgs.
Joint Motion to Terminate for Inter Partes Review of U.S. Pat. No. 9,022,260 (IPR2016-01870) and U.S. Pat. No. 8,590,757 (IPR2016-01866), 3 pgs.
Office Action for Japanese Patent Application No. 2016-502118, dated Apr. 7, 2017, 9 pgs.
Office Action for U.S. Appl. No. 15/177,114, dated May 31, 2017, 12 pgs.
Office Action for U.S. Appl. No. 15/602,744, dated Aug. 8, 2017, 42 pgs.
Office Action for Korean Patent Application No. 10-2015-7028949, dated Jul. 20, 2017, 20 pgs.
Office Action for U.S. Appl. No. 15/177,114, dated Oct. 3, 2017, 5 pgs.
Office Action for European Patent Application No. 14773586.4, dated Oct. 12, 2017, 5 pgs.
Office Action for Chinese Patent Application No. 201480023993.2, dated Sep. 26, 2017, 5 pgs.
Office Action for U.S. Appl. No. 15/177,114, dated Nov. 3, 2017, 12 pgs.
Office Action for U.S. Appl. No. 15/177,114, dated Feb. 21, 2018, 13 pgs.
Office Action for U.S. Appl. No. 15/916,990, dated May 15, 2018, 5 pgs.
Office Action for U.S. Appl. No. 15/337,813, dated May 22, 2018, 6 pgs.
Office Action for U.S. Appl. No. 15/177,114, dated May 30, 2018, 5 pgs.
International Preliminary Report on Patentability and Written Opinion for PCT/US2016/59534, dated May 1, 2018, 6 pgs.
Office Action for U.S. Appl. No. 15/094,515, dated Jun. 28, 2018, 15 pgs.
Office Action for U.S. Appl. No. 16/204,581, dated Jan. 25, 2019, 5 pgs.
International Search Report and Written Opinion for International Patent Application No. PCT/US17/58820, dated Jan. 5, 2018, 12 pgs.
Office Action for U.S. Appl. No. 15/796,422, dated Nov. 26, 2018, 18 pgs.
Office Action for U.S. Appl. No. 15/094,515, dated Feb. 19, 2019, 15 pgs.
Office Action for Japanese Patent Application No. 2017-552901 (with English translation), dated Feb. 19, 2019, 9 pgs.
Notice of Allowance for U.S. Appl. No. 15/796,422, dated Mar. 27, 2019, 7 pgs.
International Preliminary Report on Patentability (IPRP) for International Application No. PCT/US2017/058820, dated May 9, 2019, 11 pgs.
Corrected Notice of Allowability for U.S. Appl. No. 15/796,422, dated May 30, 2019, 6 pgs.
Extended European Search Report for European Patent Application No. 16860977.4, dated Jun. 5, 2019, 7 pgs.
Notice of Allowance for U.S. Appl. No. 15/796,422, dated Jul. 25, 2019, 5 pgs.
Notice of Allowance for U.S. Appl. No. 16/204,581, dated Aug. 19, 2019, 5 pgs.
Notice of Allowance for U.S. Appl. No. 16/204,581, dated Oct. 9, 2019, 3 pgs.
Office Action for Chinese Patent Application No. 201480023993.2, dated Jan. 11, 2017, 20 pgs.
European Search Report for European Patent Application No. 16777348.0, dated Oct. 4, 2018, 10 pgs.
Office Action (with English translation) for Korean Patent Application No. 10-2018-7015023, dated Dec. 17, 2019, 10 pgs.
Notice of Allowance for U.S. Appl. No. 16/551,286, dated Aug. 18, 2020, 2 pgs.
Office Action for Japanese Patent Application No. 2018-521974 dated Aug. 14, 2020, 2 pgs.
Office Action with English translation for Japanese Patent Application No. 2018-521974, dated Oct. 24, 2019, 7 pgs.
Office Action for U.S. Appl. No. 15/796,422, dated Nov. 21, 2019, 20 pgs.
Office Action for Korean Patent Application No. 10-2018-7015023, dated Dec. 17, 2019, 5 pgs.
International Search Report and Written Opinion for International Patent Application No. PCT/US19/063052, 11 pgs.
Notice of Allowance for U.S. Appl. No. 15/796,422, dated Apr. 20, 2020, 4 pgs.

(56) References Cited

OTHER PUBLICATIONS

Office Action for U.S. Appl. No. 16/551,286, dated Apr. 23, 2020, 6 pgs.
Office Action (with English translation) for Chinese Patent Application No. 201680071536.X, dated Nov. 16, 2020, 16 pgs.
Office Action (with English translation) for Korean Patent Application No. 10-2020-7029046, dated Oct. 22, 2020, 11 pgs.
Examination Report issued for European Patent Application No. 17864576.8, dated Nov. 16, 2020, 5 pgs.
Notice of Allowance for U.S. Appl. No. 16/551,286, dated Jan. 19, 2021, 2 pgs.
Office Action for Japanese Patent Application No. 2020-060090, dated Feb. 19, 2021, 1 pg.
Office Action for U.S. Appl. No. 16/694,641, dated Mar. 17, 2021, 17 pgs.
Moriguchi Yuko, JP-2014176494A, Google translation, dated Sep. 2014, 14 pgs.
Office Action with English translation for Chinese Patent Application No. 201680071536.X, dated Apr. 7, 2021, 18 pgs.

* cited by examiner

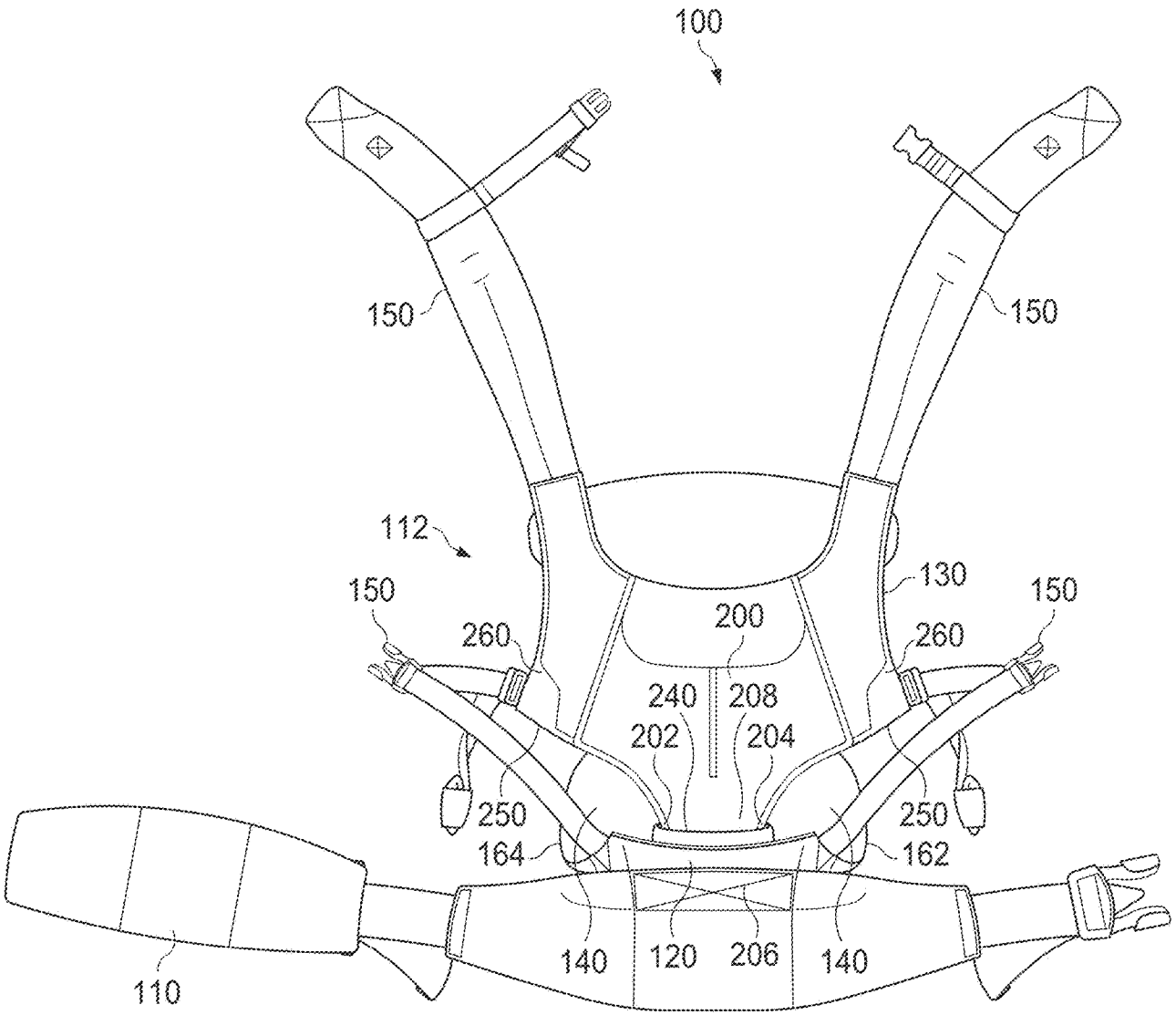
FIG. 2B
AMENDED

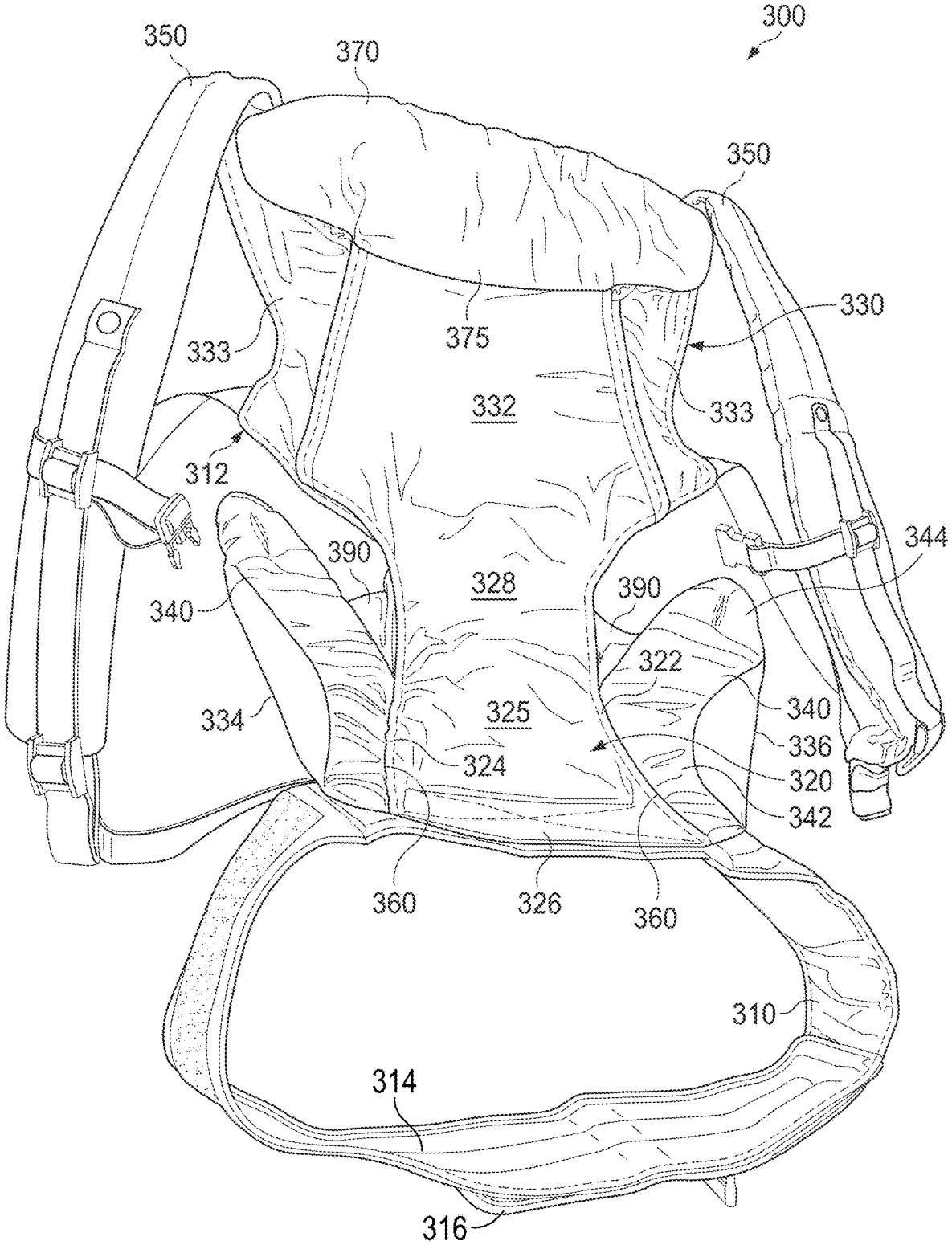
FIG. 3
AMENDED

CHILD CARRIER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application is a continuation of, and claims a benefit of priority under 35 U.S.C. § 120 of the filing date of U.S. patent application Ser. No. 16/204,581 filed Nov. 29, 2018, entitled, "Child Carrier", which is a continuation of, and claims a benefit of priority under 35 U.S.C. § 120 of the filing date of U.S. patent application Ser. No. 15/916,990 filed Mar. 9, 2018, entitled, "Child Carrier", issued as U.S. Pat. No. 10,172,478, which is a continuation of U.S. patent application Ser. No. 15/602,744 filed May 23, 2017, entitled, "Child Carrier", issued as U.S. Pat. No. 9,955,797, which is a continuation of U.S. patent application Ser. No. 15/170,629 filed Jun. 1, 2016, entitled, "Child Carrier", issued as U.S. Pat. No. 9,713,391, which is a continuation of U.S. patent application Ser. No. 14/862,933, filed Sep. 23, 2015, entitled "Child Carrier", issued as U.S. Pat. No. 9,380,888, which is a continuation of U.S. patent application Ser. No. 14/209,580, filed Mar. 13, 2014, entitled "Child Carrier", issued as U.S. Pat. No. 9,185,993, which in turn claims the benefit of priority under 35 USC § 119(e) of U.S. Provisional Patent Application No. 61/780,161, filed Mar. 13, 2013, entitled "Infant Carrier," by Gotel et al., which are hereby fully incorporated by reference herein.

TECHNICAL FIELD

The present disclosure relates to child carriers. Even more particularly, the present disclosure relates to systems for ergonomically carrying a child in multiple orientations.

BACKGROUND

Wearable child carriers afford the wearer freedom of hand and arm movement while transporting a child secured in the carrier. Many carriers do not ergonomically support the child, allowing the child's legs to dangle. Furthermore, many carriers provide limited flexibility, only allowing the child to be properly oriented in a single orientation either facing the wearer or looking away from the wearer.

SUMMARY OF THE DISCLOSURE

Embodiments disclosed herein may be directed to a child carrier having a waist belt configured for circumventing the waist of a user, one or more panels forming an upper torso support and a hammock, and a thigh support strap extending to each side of the hammock. Each thigh support strap may have an inward end portion proximate to the hammock and an outward end portion configured for selective coupling to the upper torso support in multiple positions. When the thigh support straps are coupled to the upper torso support, the hammock and the thigh support straps form an adjustable bucket seat to support a child in an ergonomic spread-squat position. The shape of the seat adjusts and depends on the positions in which the outward end portions of the thigh support straps are coupled to the upper torso support. The carrier can be configurable to support the child in an ergonomic spread-squat position in multiple positions, including a back carry position, front carry position and side carry position and multiple orientations including inward facing and outward facing.

In some embodiments, each thigh support strap is sized to wrap around a portion of a child's pelvis, bottom and thigh when the outward end is coupled to the upper torso support. Each thigh support strap can angle laterally outward from the inward end portion to an outward end portion when the outward end portion is not coupled to the upper torso support.

The upper torso support can comprise a plurality of attachment points for each of the thigh support straps. By way of example, but not limitation, the child carrier may include a first plurality of buttons to a first side of a lateral centerline of the upper torso support to which a first of the thigh support straps can selectively couple, and a second plurality of buttons to a second side of the lateral centerline of the upper torso support to which a second of the thigh support straps can selectively couple. The outward end of each thigh support strap can include an opening for receiving a mechanical fastener, such as button, or other fastener on the upper torso support.

In some embodiments, the child carrier may further include a set of shoulder straps, each shoulder strap having a first end coupled to the upper torso support and a second end coupled to the upper torso support. The shoulder straps and waist belt can form a harness that distributes the child's weight evenly to the wearer. In some cases, weight can be distributed so a majority of the child's weight is distributed to the wearer's hips through the waist belt. The carrier can be configurable to be worn by a user in front of, in back of or to the side of the wearer with the child's weight carried near the wearer's center of gravity and close to the wearer's front, back or side in a front, back or side position, respectively.

In another broad aspect, embodiments may be directed to a method of positioning a child in a child carrier. The method may include fastening a waist belt around a waist of a user, positioning a child in a hammock having an inward end portion coupled to the belt and an outward end portion coupled to an upper torso support, wrapping a first thigh support strap under a first thigh of the child and a second thigh support strap under a second thigh of the child, fastening an outward end of the first thigh strap to the upper torso support and an outward end of the second thigh support strap to the upper torso support at selected attachment points from a plurality of attachment points to adjust the shape of the seat formed by the hammock. The first thigh support strap, the second thigh support strap and hammock may form an adjustable bucket seat that supports the child in an ergonomic spread-squat position. In some embodiments, each thigh support strap has a first end coupled to a side of the hammock.

In some embodiments, the method may further include inserting at least one arm into a set of shoulder straps, each shoulder strap having a first end coupled to the upper torso support and a second end coupled to [the waist belt] the upper torso support. In some embodiments, the child carrier is positioned on a front of the user. In some embodiments, the child is positioned outward facing or inward facing. The carrier seat can be adapted to position the child in an ergonomic "spread-squat-position" that correctly positions the femur in the hip joint, or acetabulum, so that all areas of the acetabulum are strained equally.

The disclosure and various features and advantageous details thereof are explained more fully with reference to the exemplary, and therefore non-limiting, embodiments illustrated in the accompanying drawings and detailed in the following description. Descriptions of known starting materials and processes may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

BRIEF DESCRIPTION OF THE DRAWINGS

The drawings accompanying and forming part of this specification are included to depict certain aspects of the invention. A clearer impression of the invention will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 2A, 2B and 2C are diagrammatic representations of one embodiment of a child carrier;

FIG. 3 is a diagrammatic representation of another embodiment of a child carrier;

DETAILED DESCRIPTION

Figure 1A:
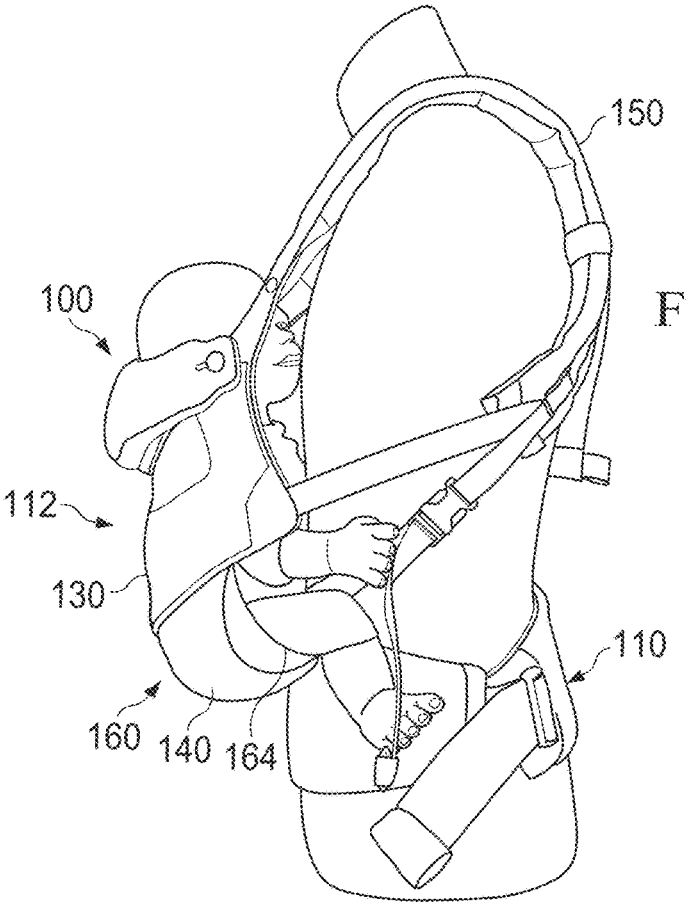
FIGS. 1A, 1B and 1C are diagrammatic representations illustrating one embodiment of a child carried in a child carrier.

Child carriers and related methods and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

The present disclosure relates to child carriers that allow a child, including an infant, to be carried in a manner that supports the child and maintains the child's pelvis and thighs in a preferred ergonomic position. Embodiments described herein also allow [an] *a* child to be carried in an outward facing orientation (i.e., facing away from the person carrying the child) or an inward facing orientation (i.e., facing toward the person carrying the child), and further allow the child to be carried on the front or back or to the side of the person carrying the child. In particular, embodiments described herein provide carriers that support the child's bottom, pelvis and thighs in a desired position in both an outward facing orientation and an inward facing orientation. The carrier can be worn by a user in front of, in back of or to the side the wearer with the child's weight carried near the wearer's center of gravity and close to the wearer's front, back or side in a front, back or side position, respectively.

According to one embodiment, an upper torso support ergonomically supports a child's back or front torso when being carried. In addition, the hammock center and supportive thigh straps can cooperate to create an adjustable thigh support bucket seat. Multiple position attachments located on the upper torso support, allow for the supportive thigh straps to move and mold to the child's thighs when carried in the ergonomic spread-squat position. The thigh straps can attach via buttons or other attachment mechanism to the upper torso panel. The adjustable bucket seat can support the child's hips, pelvis, bottom and both upper thighs when the child is being carried in various orientations. This can allow for a wider range of movement for the child in the inward, forward facing and hip position. The adjustable bucket seat can be attached to the waist band and, in some embodiments, the shoulder straps.

The carrier can be ergonomic for the wearer as well. A padded waist belt and shoulder straps can form a configurable harness that can position the carrier in a front, side or back carry position while distributing the weight evenly to the wearer. The harness may be adjusted such that the upper torso panel and supportive and adjustable bucket seat position the child close to the wearer's center of gravity which distributes the child's weight evenly.

Figure 1B:
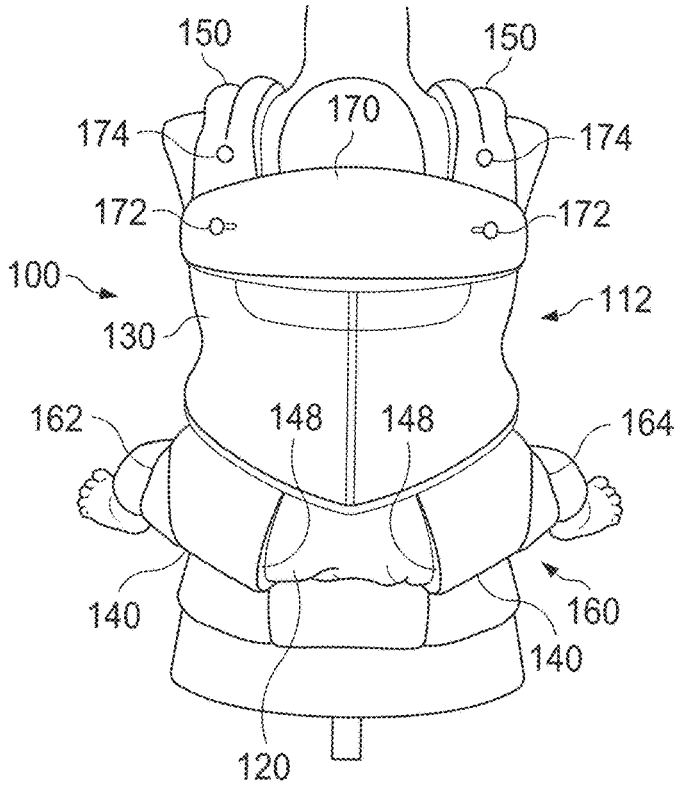
Figure 1C:
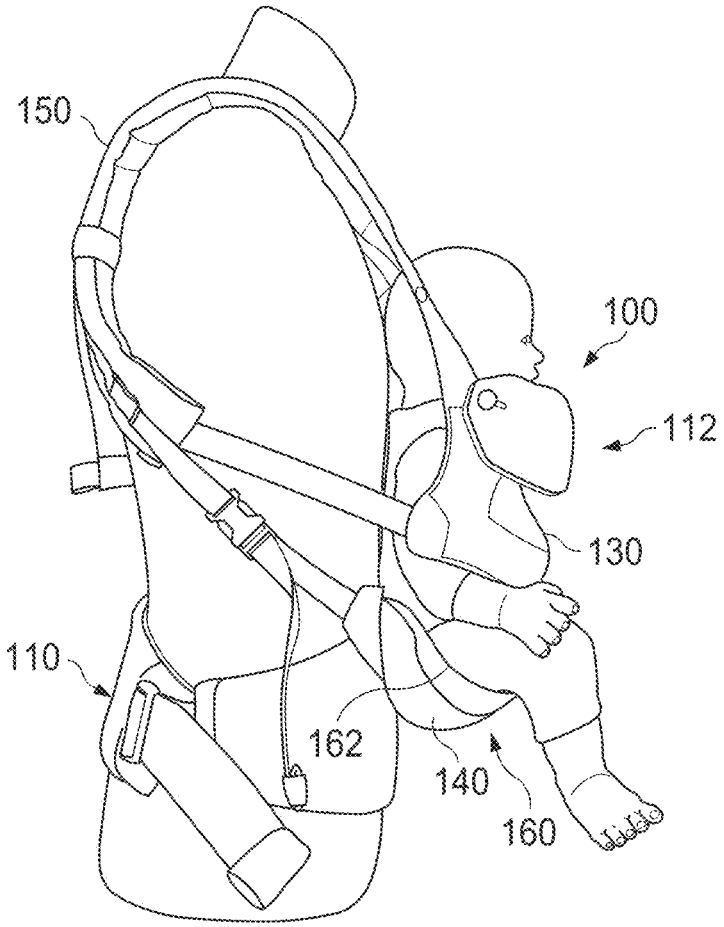

FIG. 1A is a diagrammatic representation of one embodiment of a child carried in an inward facing orientation in a child carrier 100 worn by an adult wearer. FIG. 1B is a diagrammatic representation of another view of one embodiment of the child carried in child carrier 100 in the inward facing orientation. FIG. 1C is a diagrammatic representation of one embodiment of a child carried in an outward facing orientation in child carrier 100.

Carrier 100 comprises a waist belt 110, a main body 112 having an upper torso support portion 130 and a hammock portion 120, thigh support straps 140 and shoulder straps 150. A child can be supported in a child carrying area created by the main body 112 in cooperation with the wearer's torso. Upper torso support portion 130 ergonomically supports the child's back or front torso while hammock portion 120 cooperates with thigh support straps 140 to form a supportive and adjustable bucket seat 160. Waist belt 110 and shoulder straps 150 provide a harness that distributes the child's weight to the wearer.

Hammock portion 120 and thigh support straps 140 can pass from the inward side of the child carrying area (the side closer to the wearer's torso) to an outward side to form the seat 160. The supportive and adjustable seat 160 can be a bucket seat with a generally concave inner profile from the inward side to the outward side and from left to right. Seat side edges 162, 164 can be higher than the center of the seat and can be spaced such that the side edges pass under and around the child's thighs at a distance from the child's hips such that the child's legs do not dangle down. In some embodiments, padding on thigh support straps 140 may provide additional support.

The adjustable bucket seat 160 can be continuous from the seat first side edge 162 to the seat second side edge 164. To this end, the inner side edges 148 of the thigh support straps 140 may overlap hammock portion 120 along all or a substantial portion of lengths of straps 140. However, in some cases, the weight of a child may cause some spread between the thigh support straps 140 and hammock portion 120. To minimize gaps, elastic material or other biasing mechanism may be provided to draw thigh support straps 140 together or to cover gaps.

The seat side edges 162, 164 may be formed by the outer edges of the thigh support straps 140 (e.g., such that the leftmost edge of the seat is formed by an edge of a thigh support strap 140 and the rightmost edge of the seat is formed by an edge of another thigh support strap 140). The angle or separation of side edges 162 and 164 may be adjusted to adjust the shape of seat 160. The outward end portions of each thigh support strap 140 may couple to upper torso support portion 130 at multiple locations, allowing the shape of seat 160 to be adjusted. For example, a first seat shape may be more comfortable for a child in an inward facing position while a second seat shape may be more comfortable for the child in an outward facing position.

The adjustable bucket seat is constructed to support the child in an ergonomic spread squat position with the child's pelvis, bottom and thighs all being supported. The child's weight can be supported so that the child is squatting in the seat rather than sitting rather than sitting with the child's weight primarily on the sacrum. The child can be supported with the knees higher than the bottom, in some cases higher than 90 degrees. The bucket seat can form a sling or pouch that is wider than the child's hips in which the child's bottom is supported. The side edges pass under and around the child's thighs at a distance from the child's hips where the portion of the side edges that pass under and around the child's thighs is higher than the child's bottom to lift the child's knees. The thigh support straps 140 can have sufficient stiffness such that in an outward facing orientation (see e.g., FIG. 1C), a portion of the side edges that wraps to the inside of the child's thighs can encourage the child's legs to spread. In an inward facing orientation (see e.g., FIG. 1B, the child's thighs may be encouraged to spread by the thigh support straps or wearer's torso).

In the ergonomic spread squat position (also known as the "frog leg", "frog" or "squat spread" position) the flexion at the hip joint is at least 90° and in some cases is 110° to 120° from the coronal plane, and the spreading angle can average at approximately 45-55° from the median plane. The angle of the hips and spread can depend on the form factor of the carrier and developmental stage of the child. In one embodiment, the carrier can be adapted to support the child in a position with the child's femur approximately 90° to 110° (or other elevated position) from the coronal plane and to position with the child's knees with an amount of spreading. The amount of spreading may depend on the developmental stage of the child and orientation with a newborn having less than 30°, then approximately 30°, then approximately 35°-40° and so on so, such that the final spread is approximately 40°-45°, though other amounts of spreading may be achieved including (e.g., for example approximately 55°). In one embodiment, the spreading may be at least 20° degrees from the median plane. The child's weight can be distributed across the child's bottom, thighs and back so that the sacrum does not bear too much weight and the child can rest with a more naturally curved "C" spine in a spread squat position that is believed to be better for pelvic development. In some cases, the knees are not spread. It can be noted, however, that the child can be positioned in any comfortable position, preferably emphasizing a supportive posture rather than a posture where the child is primarily sitting on his or her sacrum.

Carrier 100 may be shaped to provide side leg openings for seat 160 between carrier 100 and the wearer's torso. For example, if upper torso portion 130 is sufficiently wide to wrap around the sides of the child, carrier 100 may be shaped so that seat 160 is narrower than upper torso support portion 130 to provide side openings for the child's legs to pass out of the child carrying area.

Shoulder straps 150 can be configured to form a loop on either side of the lateral centerline of carrier 100. Each shoulder strap 150 may connect to upper torso support portion 130 at multiple locations to pull upper torso support portion 130 toward the wearer. A shoulder strap may also couple to a thigh support strap or other portion of carrier 100. Shoulder straps 150 may be adjustable and, in some cases, can be re-configured to support multiple carrier positions, such as a side carry position or back carry position.

Waist belt 110 may be padded and configured to rest on the wearer's hips. Preferably, the harness is configured so that the child's weight is evenly distributed to the wearer's hips and shoulders and even more preferably such that the child's weight is distributed evenly to the wearer's hips and shoulders and in some cases primarily to the wearer's hips rather than shoulders. In some cases, 70 percent or more of the child's weight can be distributed to the wearer's hips through waist belt 110, thereby promoting wearer comfort and diminishing wearer fatigue.

A child may be positioned in carrier 100 by positioning the child's bottom in hammock portion 120 and wrapping thigh support straps 140 under and around the child's legs, and coupling thigh support straps 140 upper torso support portion 130. Positioning a child in carrier 100 may include securing the child in carrier 100, for example coupling upper torso support portion 130 to shoulder straps 150.

Carrier 100 can include an adjustable collar 170 that can extend upper torso support portion 130. When extended, adjustable collar 170 can provide additional support for taller children seated in an inward facing orientation, but can fold back so that a child's face is not obstructed when the child is seated in the outward facing orientation. In the non-extended position, adjustable collar 170 can provide additional neck support for smaller children.

Complementary extended position securing mechanisms and complementary non-extended position securing mechanisms such as, but not limited to, but not limited to, buttons, snaps, d-rings and clips or hooks, patches of hook and loop material or other securing mechanism, can be provided so that adjustable collar 170 can be secured in an extended position or folded back and secured in a non-extended position. In the embodiment illustrated, for example, adjustable collar 170 can include button holes to receive buttons 174 of shoulder straps 150 to secure in an extended position and receive buttons 172 on the outer side of upper torso support portion 130 to secure in a folded back position.

Figure 2A:
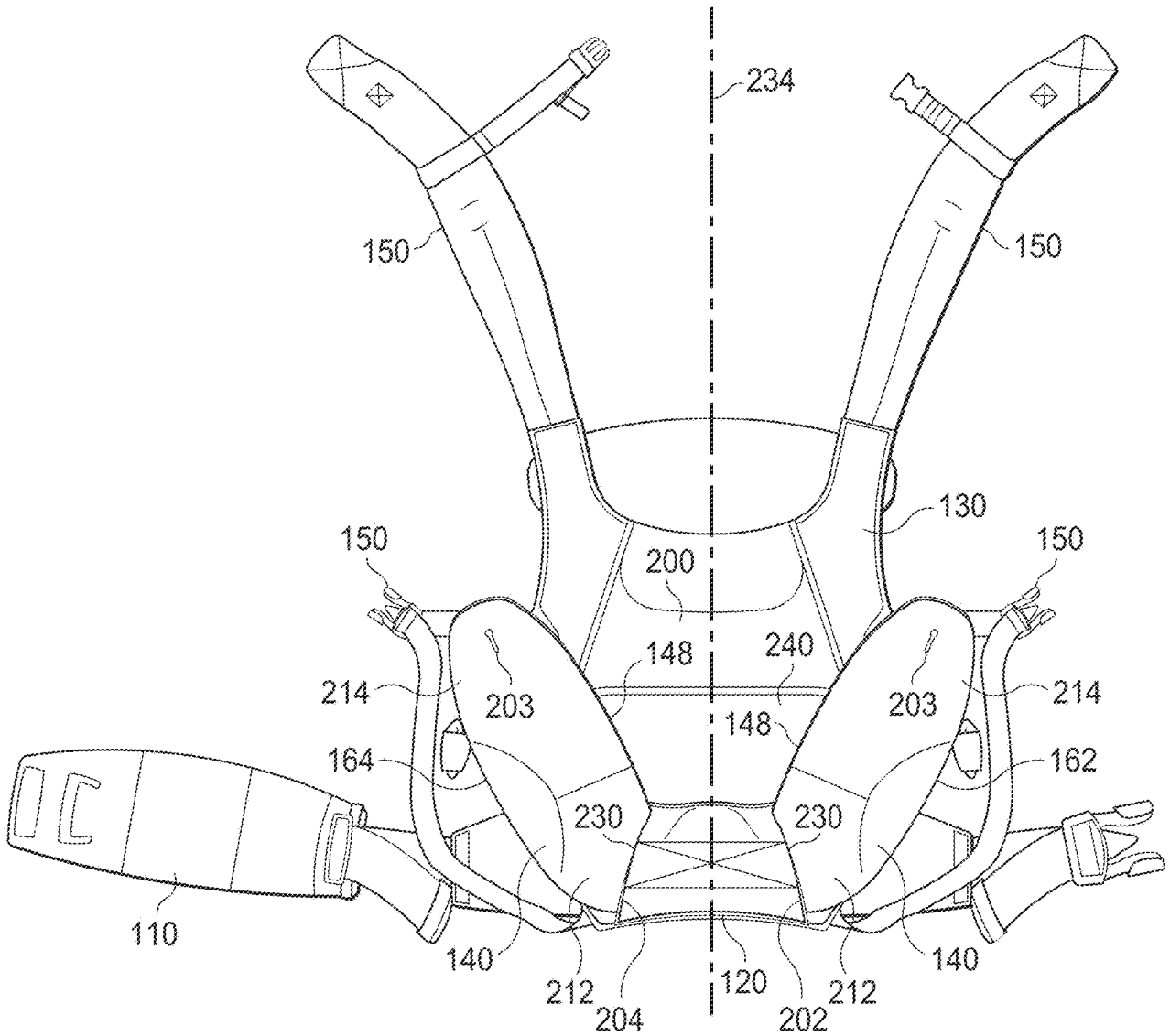

FIG. 2A is a diagrammatic representation of the inner side of one embodiment of carrier 100 with thigh support straps uncoupled from upper torso support portion 130. In FIG. 2A, waist band 110 folded back to show additional features of one embodiment of carrier 100. FIG. 2B is a diagrammatic representation of an outer side one embodiment of carrier 100 with waist belt 110 in its down (ready to wear) position and with thigh support straps 140 coupled to the upper torso support portion 130.

Upper torso support portion 130 may include one or more panels formed from a single piece of material or multiple pieces of material, multiple layers of materials, or multiple materials. For example, in some embodiments, upper torso support may be formed with an inner layer selected for comfort against a child's skin and an outer layer selected for breathability, fashion, stain resistance, etc. Upper torso support may have straight edges, tapered edges for an area of increased width or decreased width, or otherwise configured for comfort or security of a child or a user.

Hammock portion 120 may be formed between waist belt 110 or other structure and upper torso support portion 130. Hammock portion 120 may comprise lateral edges 202, 204, a first end portion 206 coupled to waist belt 110 or other portion of carrier 100, a second end portion 208 coupled to upper torso support portion 130 and a center hammock portion that extends between the lateral edges 202, 204, first end portion 206 and second end portion 208. Lateral edges 202 and 204 of hammock portion 120 may be straight, curved or laterally tapered.

Hammock portion 120 may be formed from a single piece of material, or may be formed from multiple pieces of material, multiple layers of materials, or multiple materials. The junction between upper torso support portion 130 and hammock portion 120 may be a substantially seamless transition. For example, in one embodiment, hammock portion 120 and an upper torso support panel 200 may comprise a unitary construction of one or more layers of material. In other embodiments, the junction may include seams, edges or other features delineating between upper torso support portion 130 and hammock portion 120.

Thigh support straps 140 can be provided that extend to either side of the hammock center portion. Each thigh support strap can include a first end portion 212 and a second end portion 214. Each thigh support strap can include a seat outer edge 162, 164 and a second thigh support strap inner edge 148 that can extend from the first end portion 212 to the second end 214. A first end portion 212 of each thigh support strap 140 can be coupled to waist belt 110 or other structure and a second end portion 214 can be coupled to the upper torso support portion 130 or other structure such that the first end portion 212 is more inward (closer to the wearer) than the second end portion 214 when the carrier is worn. Thigh support straps 140 may be configured to pass under and around thighs of a child when in use.

At least one of the end portions of each thigh support strap 140 may be selectively coupled. Accordingly, carrier 100 can include a securing mechanism to secure first end portions 212 or second end portions 214. The securing mechanism can include any suitable mechanism such as, but not limited to, buttons, snaps, d-rings and clips or hooks, patches of hook and loop material or other securing mechanism. In some cases, an end portion can be secured in multiple locations.

In the embodiment of FIG. 2A, the first end portions 212 of thigh support straps 140 are stitched, glued, formed as a unitary piece with or otherwise fixedly joined to hammock portion 120, waist belt 110 or other portion of carrier 100 that is to the inward side of the child carrying area when carrier 100 is worn. The first end portion 212 may be coupled in a manner that forms a flexible hinge 230 that allows thigh support strap 140, to swing outward (away from the wearer).

Hinge 230 may be formed by any suitable mechanism including, but not limited to, stitching or otherwise joining a first end edge of a thigh support strap 140 to a lateral edge 202 or 204 of hammock portion 120 or other structure. The axis of rotation of each hinge 230 can be selected to be parallel to the lateral centerline (indicated at 234) of carrier 100 or at another angle when carrier 100 is in a flat configuration. According to one embodiment, hinge 230 is oriented so that the axis of rotation slopes out laterally from a first end of the hinge 230 to a second end of the hinge 230 where the first end is an end more proximate to upper torso support portion 130. The hinge axis may slope out at a desired angle relative to the lateral centerline, but preferably slopes outward less than 45 degrees and even more preferably less than 25 degrees. In some embodiments, the hinge axis slopes outward relative to the lateral centerline at an angle from 10 degrees to 25 degrees when the carrier is in a flat configuration.

Second end portions 214 can be selectively coupled to carrier 100. For example, upper torso portion 130 may include multiple buttons or other securing mechanisms on each side of the lateral centerline 234 so that each thigh support strap 140 can be selectively secured at multiple locations (e.g., using button holes 203 or other securing mechanism). The second end portions 144 may couple to upper torso portion 130 such that the portions edges 162 and 164 that pass under the child's thighs is higher than the child's bottom and pelvis to lift the child's knees. In some embodiments, the second end 144 (the end further from the wearer) of each thigh support strap 140 is higher than the first end when carrier 100 is worn. Second end portions 214 may also secure to carrier 100 at other locations.

Thigh support straps 140 may be configured to pass under and around thighs of a child when in use. When second ends 214 of thigh support straps 140 are coupled to upper torso support portion 130, thigh support straps 140 and hammock portion 120 form a supportive bucket seat extending from a set first side edge 162 to a seat second side edge 164. The seat first side edge 162 is formed by a laterally outer side edge of a first thigh support strap 140 and the seat second side edge 164 is formed by the laterally outer side edge of a second thigh support strap 140. In some embodiments, padding on thigh support straps 140 may provide additional support to lift a child's thighs.

A fabric bridge 240 can provide a biasing mechanism to help pull inner edges 148 of thigh support straps 140 toward each other to prevent gaps. Fabric bridge 240 may also help cover gaps between hammock portion 120 and thigh support straps 140. In one embodiment, fabric bridge 240 may be coupled to hammock portion 120.

In some cases, the width of the seat may be less than the width of upper torso support portion 130. In one embodiment, the width of the seat may be narrower than the width of upper torso support portion 130 where the bottom ends of shoulder straps 150 couple to upper torso support portion 130 (e.g., indicated at area 260 of FIG. 2B for one embodiment). To this end, the lateral edges of upper torso support portion 130 may taper inward to transition to lateral edges 202 and 204 of hammock portion 120 (FIG. 2A) forming a horizontal, sloped or curved transition edge portion 250 that can act as the top edge of a side leg opening. When carrier 100 is worn, upper torso support portion 130 may wrap around to the sides of the child (e.g., as illustrated in FIGS. 1A and 1C), while leaving an opening formed by transition edges 250 and seat edges 162 and 164. The child's legs and arms may pass out of the child carrying area under the transition edge 250.

Figure 2C:
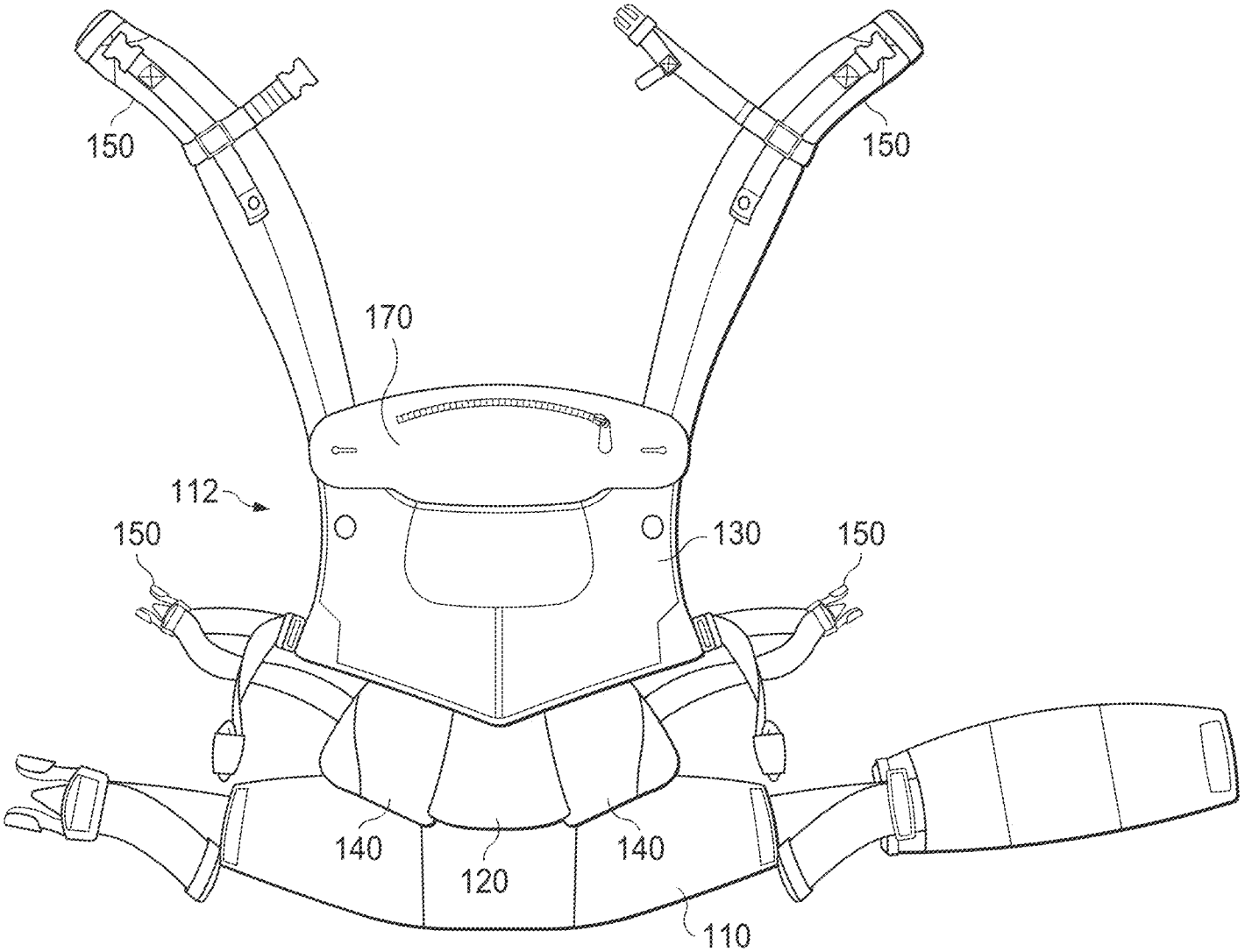

With reference to FIG. 2C, in some embodiments, adjustable collar 170 may support a child's head and/or neck. Adjustable collar 170 may be positioned according to the direction the child is facing (i.e., inward or outward), the size of the child, or other criteria. Adjustable collar 170 may be formed from a separate piece of material or a separate material and joined to upper torso support portion 130, or adjustable collar 170 and upper torso support portion 130 may be formed from the same material or piece of material such adjustable collar 170 is rotatable relative to upper torso support portion 130 such that adjustable collar 170 may be extended or folded back.

FIG. 3 is a diagrammatic representation of another embodiment of a child carrier 300, similar to child carrier 100, comprising a waist belt 310, a main body 312 having a hammock portion 320 and an upper torso support portion 330, thigh support straps 340 and shoulder straps 350. A child can be supported in a child carrying area created by the main body 312 in cooperation with the wearer's torso. Upper torso support portion 330 ergonomically supports the child's back or front torso when being carried while hammock portion 320 cooperates with thigh support straps 340 to form a supportive bucket seat.

Waist belt 310 and shoulder straps 350 provide a harness that distributes the child's weight to the wearer. Shoulder straps 350 and waist belt 310 can be adjustable so that the harness evenly distributes the child's weight to the wearer. In some cases, the harness can be adjustable to distribute a majority of the child's weight to the wearer through waist belt 310 as discussed above.

A first end of a shoulder strap 350 and a second end of a shoulder strap 350 may couple to upper torso support portion 330 to form a loop that pulls the upper torso support portion 330 toward the wearer thereby supporting the child's torso. Shoulder straps 350 may be reconfigurable so that the carrier can be worn in a front carry position, back carry position or side carry position.

According to one embodiment, waist belt 310 comprises an adjustable waistband. A first end portion 314 of the waist belt may be sufficiently long to wrap substantially around the wearer and may include areas of hook and loop material on an outer side. In some cases, the areas of hook and loop material may be sufficiently long to substantially wrap around the wearer. A second end portion 316 may include areas of hook and loop material on an inner side. The hook and loop material on first portion 314 and second portion 316 can be used adjust waist belt 310 to a broad range of sizes, (e.g., 26-55 in/66-140 cm or other range of sizes) and be worn high or low to maximize comfort, especially in the event of a C-section, and provide low back support. Other securing mechanisms may also be used. Furthermore, any suitable waist belt may be used.

Upper torso support portion 330 may include a main upper torso support panel 332. Upper torso support panel 332 may be formed from a single piece of material, or may be formed from multiple pieces of material, multiple layers of materials, or multiple materials. For example, in some embodiments, upper torso support panel 332 may be formed with an inner layer selected for comfort against a child's skin and an outer layer selected for breathability, fashion, stain resistance, etc. In some embodiments, upper torso support panel 332 may be formed with a central portion selected for comfort and lateral portions selected for breathability, security, etc. Upper torso support panel 332 may have straight edges, tapered edges for an area of increased width or decreased width, or otherwise be configured for comfort or security of a child or a user. Upper torso support portion 330 may also include harness panels 333. A first end of a shoulder strap 350 may join to a top portion of a harness panel and a second end of a shoulder strap may join to a lower portion of a harness panel 333.

Hammock portion 320 may be formed between waist belt 310 or other structure and upper torso support portion 330. Hammock portion 320 may comprise lateral edges 322, 324, a first end portion 326 coupled to waist belt 310 or other portion of carrier 300, a second end portion 328 coupled to upper torso support portion 330 and a center hammock portion 325 that extends between the lateral edges 322, 324, first end portion 326 and second end portion 328. Lateral edges 322 and 324 of hammock portion 320 may be straight, curved or laterally tapered.

Hammock portion 320 may be formed from a single piece of material, or may be formed from multiple pieces of material, multiple layers of materials, or multiple materials. The junction between upper torso support portion 330 and hammock portion 320 may be a substantially seamless transition. For example, in one embodiment, hammock portion 320 and an upper support panel 332 may comprise a unitary construction of one or more layers of material. In other embodiments, the junction may include seams, edges or other features delineating between upper torso support portion 330 and hammock portion 320.

The lateral edges of upper torso support portion 330 may taper inward to transition to lateral edges 322 and 324 of hammock portion 120 (FIG. 2A) forming a horizontal, sloped or curved transition edge portion that can act as the top edge of a side leg opening. When carrier 300 is worn, upper torso support portion 330 may wrap around to the sides of the child (e.g., as Illustrated in FIGS. 1A and 1C), while leaving an opening formed by the transition edges and seat edges. The child's legs and arms may pass out of the child carrying area under the transition edges.

Thigh support straps 340 can be provided that extend to either side of hammock center portion 325. Each thigh support strap can include a first end portion 342 and a second end portion 344. A first thigh strap side edge and a second thigh strap side edge can extend from the first end portion to the second end. A first end portion 342 of each thigh support strap 340 can be coupled to waist belt 310, hammock portion 320 or other structure and a second end portion 344 can be coupled to the upper torso support portion 330 or other structure such that the first end portion is more inward (closer to the wearer) than the second end portion when the carrier is worn. Thigh support straps 340 may be configured to pass under and around thighs of a child when in use.

At least one of the end portions of each thigh support strap 340 may be selectively coupled. Accordingly, carrier 300 can include a securing mechanism to secure first end portions 342 or second end portions 344. The securing mechanism can include any suitable mechanism such as, but not limited to, buttons, snaps, d-rings and clips or hooks, patches of hook and loop material or other securing mechanism. In some cases, an end portion can be secured in multiple locations.

In the embodiment of FIG. 3, the first end portions 342 of thigh support straps 340 are stitched, glued, formed as a unitary piece with or otherwise fixedly joined to hammock portion 320, waist belt 310 or other portion of carrier 300 that is to the outward side of the child carrying area when carrier 300 is worn. The first end portion 342 may be coupled to another portion of carrier 300 in a manner that forms a flexible hinge that allows thigh support strap 340, to swing outward (away from the wearer). The hinge 360 may be formed by any suitable mechanism including, but not limited to, stitching or otherwise joining the first end edge of a thigh support strap 340 to a lateral edge 322 or 324 of hammock portion 320 or other structure. The axis of rotation of each hinge can be selected to be parallel to the lateral centerline of carrier 300 or at another angle when carrier 300 is in a flat configuration. According to one embodiment, each hinge is oriented so that the axis of rotation slopes out laterally from a first end of the hinge to a second end of the hinge, where the first end is an end more proximate to upper torso support portion 330. The hinge axis may slope out at a desired angle relative to the lateral centerline, but preferably slopes outward less than 45 degrees and even more preferably less than 25 degrees. In some embodiments, the hinge axis slopes outward relative to the lateral centerline at an angle from 10 degrees to 25 degrees when the carrier is in a flat configuration.

Second end portions 344 can be selectively coupled to carrier 300. Upper torso portion 330 may include multiple buttons or other securing mechanisms on each side of the lateral centerline so that each thigh support strap 340 can be selectively secured at multiple locations. The second end portions 344 may couple to upper torso portion 330 such that the portions of edges 334 and 336 that pass under the child's thighs is higher than the child's bottom and pelvis to lift the child's knees. Additionally, the construction of thigh support straps 340 can be selected so that the portion of the side edges 334 and 336 that wraps to the inside of the child's thighs can encourage the child's legs to spread. The second end portions 344 may couple to upper torso portion 330 such that the second end (the end further from the wearer) of each thigh support strap 340 is higher than the first end when carrier 300 is worn. Second end portions 344 may also secure to carrier 300 at other locations.

Thigh support straps 340 may be configured to pass under and around thighs of a child when in use. When second ends 344 of thigh support straps 340 are coupled to upper torso support portion 330, thigh support straps 340 and hammock center portion 325 and upper torso support portion 330 form a supportive bucket seat extending from a first side edge to a seat second side edge. The seat first side edge is formed by a laterally outer side edge of a first thigh support strap 340 (e.g., side edge 334 of a first thigh support strap 340) and the seat second side edge is formed by the laterally outer side edge of a second thigh support strap 340 (e.g., side edge 336 of a second thigh support strap 340).

The embodiment of FIG. 3 can support a child in a similar manner as discussed above. In the embodiment of FIG. 3, however, the biasing mechanism can comprise gussets 390 that extend between the edges of thigh support straps 340 and edges of hammock portion 320.

Carrier 300 can include an adjustable collar 370 to support a child's head and/or neck. Adjustable collar 370 may be positioned according to the direction the child is facing (i.e., inward or outward), the size of the child, or other criteria. Adjustable collar 370 may be formed from a separate piece of material or a separate material and joined to upper torso support portion 330, or adjustable collar 370 and upper torso support portion 330 may be formed from the same material or piece of material such adjustable collar 370 is foldable (e.g., rotated about flexible hinge 375) to upper torso support portion 330 such that adjustable collar 370 may be extended. As discussed above, the adjustable collar 370 may secure in multiple positions using securing mechanism.

Child carrier 300 can carry a child in an inward facing orientation or an outward facing orientation and in front carry, back carry, side carry positions. The child may be seated in an inward facing orientation or an outward facing orientation. The child may be carried with the child's weight near the wearer's center of gravity with the child's thighs and knees ergonomically angled such that the child is supported in a spread squat position.

Figure 4A:
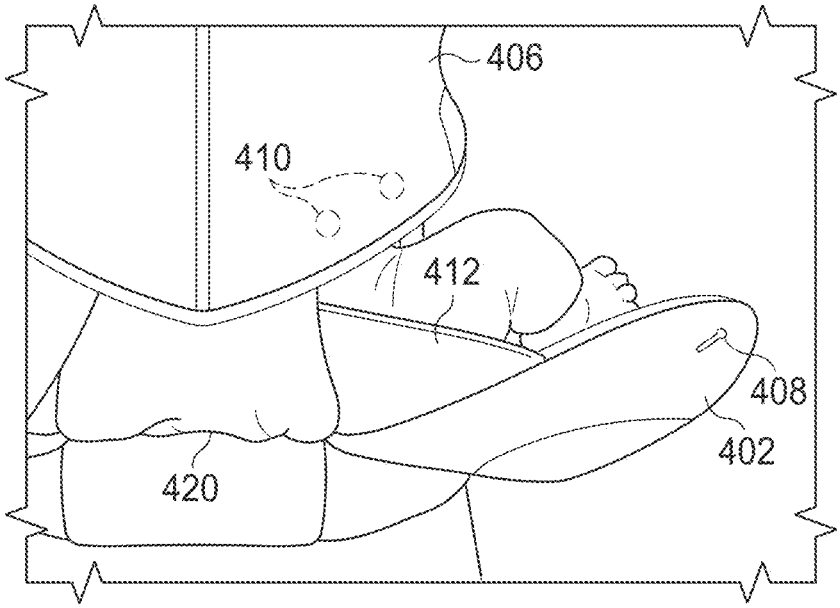
FIGS. 4A and 4B are diagrammatic representations of one embodiment of a portion of a child carrier.
Figure 4B:
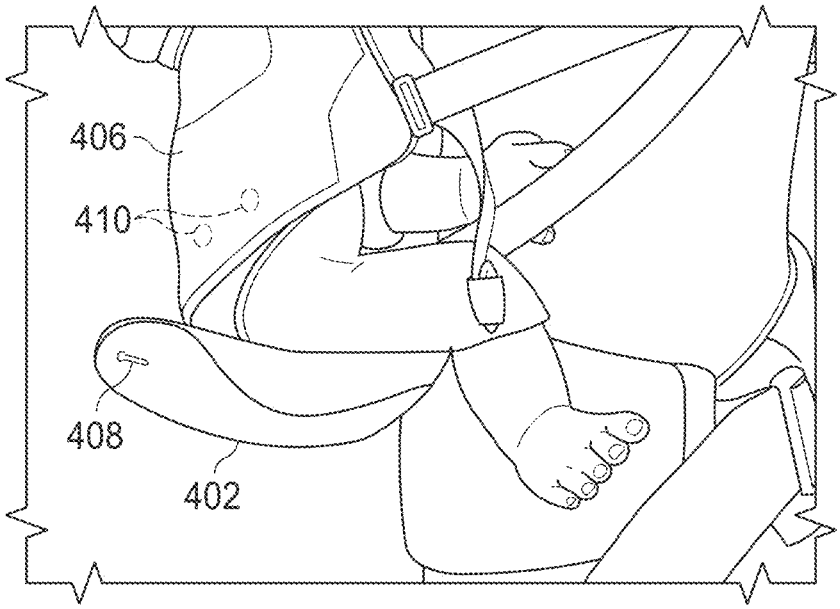

FIG. 4A and FIG. 4B are diagrammatic representations of one embodiment of securing a thigh support strap 402 (e.g., such as a thigh support strap 140 of FIGS. 2A-2C, or a thigh support strap 340 of FIG. 3). According to one embodiment, thigh support strap 402 and an upper torso support portion 406 (e.g., such as an upper torso support portion 130 of FIGS. 2A-2C, or upper torso support portion 330 of FIG. 3) can include corresponding securing mechanisms. The securing mechanisms can include any suitable mechanism such as, but not limited to, buttons, snaps, d-rings and clips or hooks, patches of hook and loop material or other securing mechanism. Upper torso support portion 406 may include multiple attachment points. By way of example, but not limitation, the outward end portion of each thigh support strap 402 can include a button hole 408 and upper torso support portion 406 can include multiple buttons 410 so that each thigh support strap 402 can be secured in multiple locations, allowing the shape of a seat to be adjusted. Buttons 410 (or other securing mechanism) may be concealed under a panel or exposed. Thigh support straps 402 may be secured and unsecured as needed when the carrier is worn.

A carrier can also include a biasing mechanism 412 coupled to each thigh support strap 402. The biasing mechanism(s) can be formed of an elastic material or other material and can act to pull thigh support straps 402 laterally toward the lateral centerline of carrier 100 to prevent gaps in the seat as needed. Additionally, biasing mechanism 412 can act to cover gaps between hammock portion 420 and thigh support straps 402. According to some embodiments, fabric bridge 240 (FIGS. 2A, 2B) or gussets 390 (FIG. 3) can act as biasing mechanism 412.

Figure 5A:
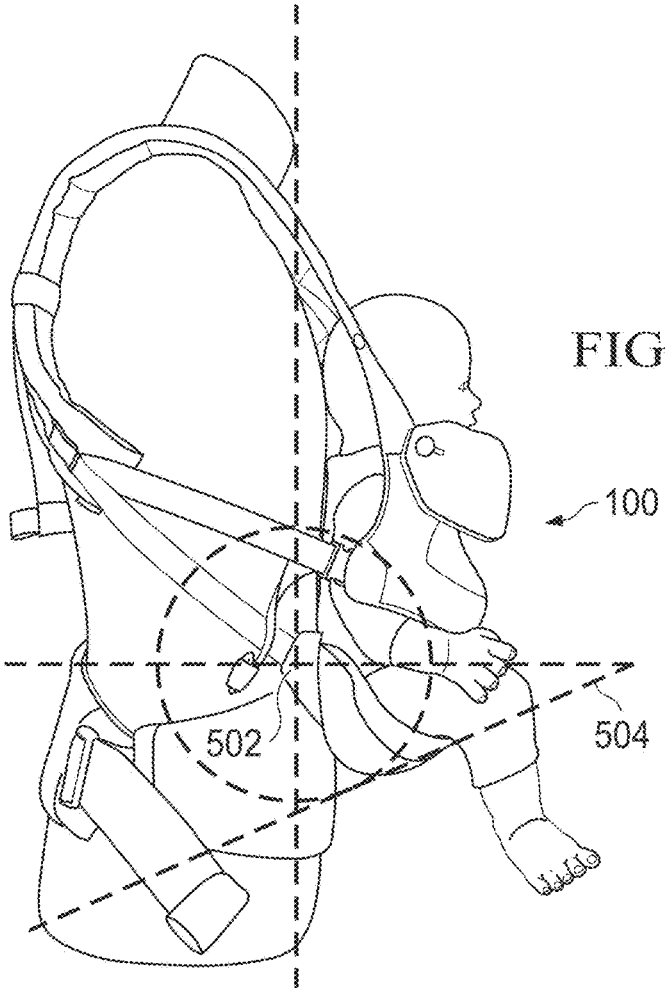
FIGS. 5A, 5B and 5C are diagrammatic representations illustrating an embodiment of wearing a child carrier.
Figure 5B:
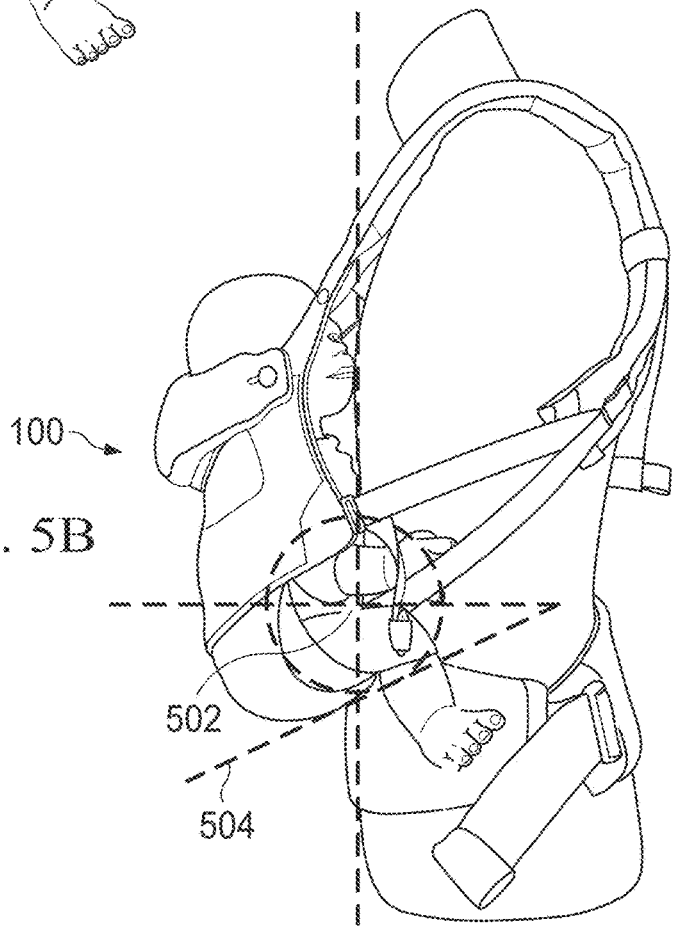
Figure 5C:
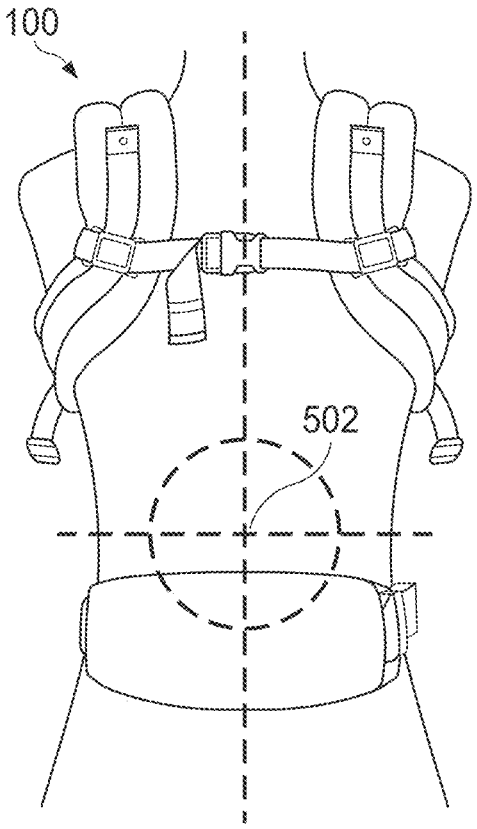

FIG. 5A and FIG. 5B are diagrammatic representations of one embodiment of a child carrier 100 carrying a child. FIG. 5A and FIG. 5B illustrate that the shoulder straps and waist belt can form a harness to evenly distribute weight evenly to the wearer. The child can be carried proximate to the wearer's center of gravity 502. Furthermore, in both the outward facing position (FIG. 5A) and inward facing position (FIG. 5B), the child's lower torso, pelvis and bottom area are ergonomically supported by the hammock and thigh support straps so that the child's thighs and knees are ergonomically angled higher than the child's hips (as indicated by line 504) to support the child in an ergonomic spread-squat position. FIG. 5C is a diagrammatic representation of one embodiment of child carrier 100 worn by a wearer showing an example position of a center of gravity 502.

Figure 6:
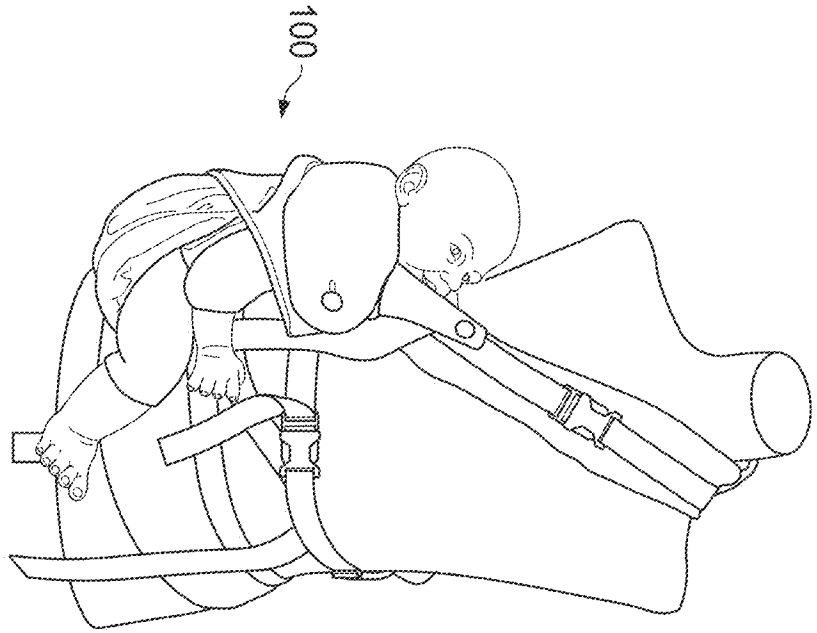
FIG. 6 is a diagrammatic representation of one embodiment of a child carrier in a side carry position.
Figure 7:
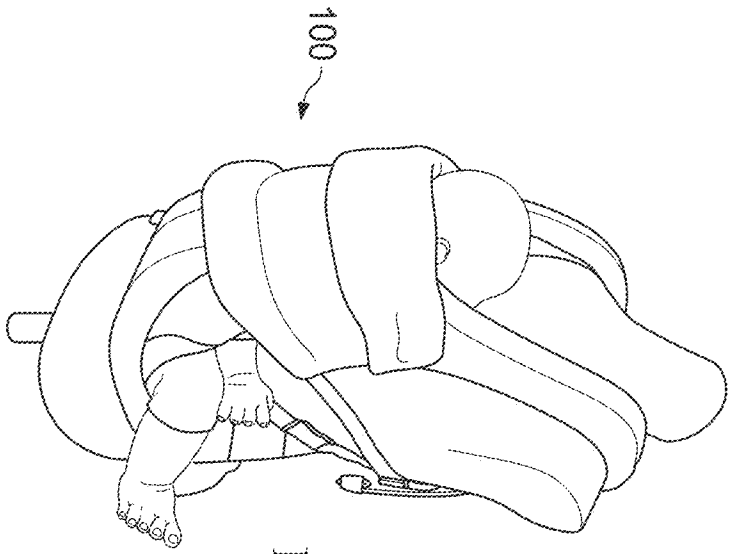
FIG. 7 is a diagrammatic representation of one embodiment of a child carrier in a back carry position.

FIG. 6 is a diagrammatic representation illustrating that a child may be carried in carrier, such as carrier 100, in a side carry position. In some cases, a child in the side carry position may be supported by the wearer's hip. The shoulder straps can be reconfigured to accommodate a side carry position by connecting each upper shoulder strap portion to the lower shoulder strap portion on the other side of the lateral centerline of the carrier with one strap forming a generally horizontal loop around the wearer's torso and the other strap looping over the wearers shoulder opposite the carrier. FIG. 7 is a diagrammatic representation illustrating that a child may be carried in a child carrier, such as carrier 100, in a back carry position. Thus, embodiments of child carriers described herein can be positioned in front, back and side positions while supporting the child in an ergonomic spread squat position. In addition, a child can be oriented in an inward facing orientation or an outward facing orientation while supported in an ergonomic spread squat position.

According to some embodiments a carrier can be a soft carrier having a main body, thigh support wraps and waist belt primarily formed of one or more pieces of natural or synthetic fiber without a rigid frame. In other embodiments, a carrier can incorporate frame elements. For example, a supportive carrier seat as discussed above can be utilized with an upper torso support that incorporates a frame.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

The invention claimed is:

1. A child carrier comprising:

a main body including a torso support portion and a hammock portion coupled to the torso support portion, *wherein the torso support portion comprises a first attachment point and a second attachment point*;

a thigh support strap extending to a side of the main body, the thigh support strap having an inward end portion proximate to the main body and an outward end portion adapted to [be coupled] *selectively attach* to the torso support portion [in multiple locations] *at the first attachment or the second attachment point*, the hammock portion and the thigh support strap adapted to form a seat to support a child in an *inward-facing* ergonomic spread-squat position when the thigh support strap is [coupled] *attached* to the [torso support portion] *first attachment point and the hammock portion and the thigh support strap adapted to form a seat to support a child in an outward-facing ergonomic spread-squat position when the thigh support strap is attached to the second attachment point*; and one or more shoulder straps, [each shoulder strap having a first end adapted to be coupled to the main body and a second end adapted to be coupled to the main body] *wherein the one or more shoulder straps are coupled to the main body and configured to support the main body*.

2. The child carrier of claim 1, wherein the seat has a first shape when the thigh support strap is coupled to the torso support portion [in a] *at the* first [location] *attachment point* and a second shape when the thigh support strap is coupled to the torso support portion [in a] *at the* second [location] *attachment point*.

3. The child carrier of claim 1, wherein the thigh support strap is sized to wrap around a portion of the child's pelvis, bottom, and thigh when the thigh support strap is coupled to the torso support [in] *at* the first [location] *attachment point* or the second [location] *attachment point*.

4. The child carrier of claim 3, further comprising a biasing mechanism coupled to the thigh support strap.

5. The child carrier of claim 4, wherein the biasing mechanism comprises [gussets] *a gusset* extending between an edge of the thigh support strap and an edge of the hammock portion.

6. The child carrier of claim 2, wherein the hammock portion and thigh support strap pass from an inward side of a child carrying area to an outward side of the child carrying area to form the seat.

7. The child carrier of claim 1, further comprising a waist belt.

8. The child carrier of claim 7, wherein the waist belt is coupled to the hammock portion.

9. The child carrier of claim 8, wherein the waist belt and the hammock *portion* cooperate to distribute a majority of the child's weight to the hips of a wearer.

10. The child carrier of claim 1, further comprising an adjustable collar.

11. The child carrier of claim 10, wherein the adjustable collar is configured to be positioned according to an orientation of the child.

12. The child carrier of claim 11, wherein the adjustable collar is formed from the main [panel] *body*.

13. The child carrier of claim 1, wherein the hammock portion and the thigh support strap are adapted to form the seat such that the child is supported in a manner whereby the flexion of the child's hip joint is at least 90 degrees from the coronal plane and the spreading angle averages between 45-55 degrees from the median plane.

14. The child carrier of claim 1, wherein the [seat] *hammock portion* is narrower than the [main body] *torso support portion*.

15. The child carrier of claim 1, wherein the main body is a single piece of material.

16. The child carrier of claim 1, wherein the hammock portion and torso support portion comprise a unitary construction.

17. The child carrier of claim 1, wherein the inward end portion of the thigh support strap is adapted to be coupled to the hammock portion or a waist belt.

18. The child carrier of claim 17, wherein the inward end portion of the thigh support strap is joined to the hammock portion with a hinge having an axis of rotation of the hinge [is] parallel to a lateral centerline of the child carrier when the carrier is in a flat configuration.

19. The child carrier of claim 1, comprising a frame element incorporated in the torso support portion.

20. The child carrier of claim 1, wherein the carrier is adapted to be alternatively worn by a wearer in a front carry, back carry, or side carry position.

* * * * *